United States Patent
Kelley et al.

(10) Patent No.: US 11,060,616 B2
(45) Date of Patent: Jul. 13, 2021

(54) SLIDING AND ROTATABLE VENTED DAMPER FOR THE CONTROL OF A FLUID THROUGH A CONDUIT

(71) Applicant: Warren Technology Inc., Hialeah, FL (US)

(72) Inventors: Winfield L. Kelley, Hialeah, FL (US); David J. Greenough, Hialeah, FL (US)

(73) Assignee: WARREN TECHNOLOGY INC., Hialeah, FL (US)

( * ) Notice: Subject to any disclaimer, the term of this patent is extended or adjusted under 35 U.S.C. 154(b) by 35 days.

(21) Appl. No.: 16/714,900

(22) Filed: Dec. 16, 2019

(65) Prior Publication Data

US 2021/0180699 A1 Jun. 17, 2021

(51) Int. Cl.
| | |
|---|---|
| F16K 1/16 | (2006.01) |
| F16K 24/04 | (2006.01) |
| F16K 24/02 | (2006.01) |
| F24F 13/14 | (2006.01) |
| F24F 13/12 | (2006.01) |

(52) U.S. Cl.
CPC .............. F16K 1/165 (2013.01); F16K 24/02 (2013.01); F16K 24/04 (2013.01); *F24F 13/12* (2013.01); *F24F 13/14* (2013.01)

(58) Field of Classification Search
CPC .......... F16K 24/04; F16K 1/165; F16K 24/02; B60H 1/00664
See application file for complete search history.

(56) References Cited

U.S. PATENT DOCUMENTS

| | | | | |
|---|---|---|---|---|
| 2,235,731 A * | 3/1941 | Spalding, Jr. | ......... | F24F 13/105 454/334 |
| 3,009,475 A * | 11/1961 | Richterkessing | ....... | F16K 24/04 137/512.1 |
| 5,218,998 A * | 6/1993 | Bakken | ................... | F24F 13/12 137/625.28 |
| 5,427,146 A * | 6/1995 | Bakken | ................... | F24F 13/12 137/625.3 |
| 6,712,335 B1 * | 3/2004 | Naughton | ................. | F16K 3/03 138/45 |
| 6,971,631 B1 * | 12/2005 | Naughton | ................. | F16K 3/03 138/45 |
| 9,874,369 B2 * | 1/2018 | Babur | ..................... | F24F 13/12 |

* cited by examiner

*Primary Examiner* — Kevin R Barss
(74) *Attorney, Agent, or Firm* — Lott & Fischer, PL

(57) ABSTRACT

The invention provides an apparatus for adjusting the flow of a fluid within a conduit, comprising a slide plate with a flat body and a fixed plate with a flat body. The slide plate and fixed plate have openings on their bodies. At a fully closed position, the openings of the slide plate do not substantially overlap with the openings of the fixed plate. By rotation of an actuator shaft and drive pin disposed thereon, the slide plate may move relative to the fixed plate, whereby the openings of the slide plate begin overlapping with the opening of the fixed plate, thereby allowing flow of fluid through the openings. Sequentially or independently from the movement of the slide plate, rotation of the actuator shaft may cause the fixed plate to rotate relative to the walls of the conduit, whereby flow of fluid may pass through the opening between the conduit and fixed plate assembly.

14 Claims, 23 Drawing Sheets

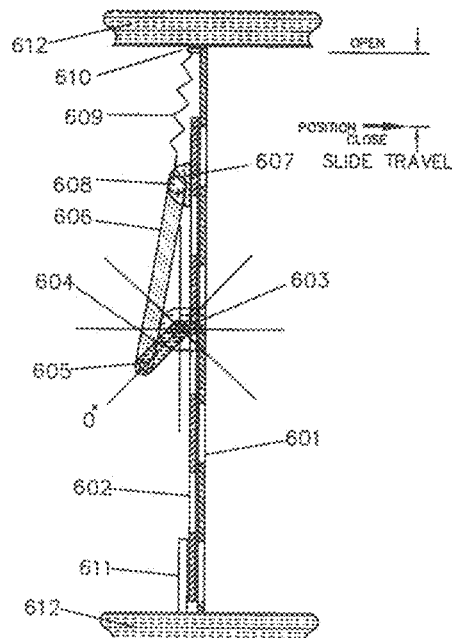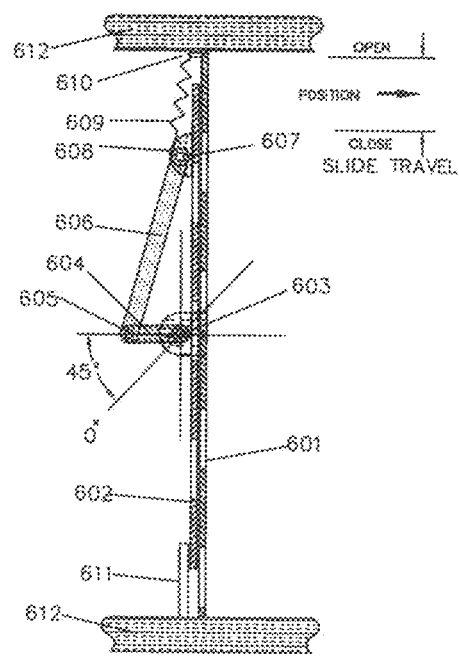
FIG.6A
Fig.6B

FULL OPEN – SLIDE
FULL CLOSED – ROTATION

ROTATE 90 DEG – 50% FLOW

FULL OPEN – SLIDE
HALF OPEN – ROTATION

ROTATE 135 DEGREES – 75% FLOW

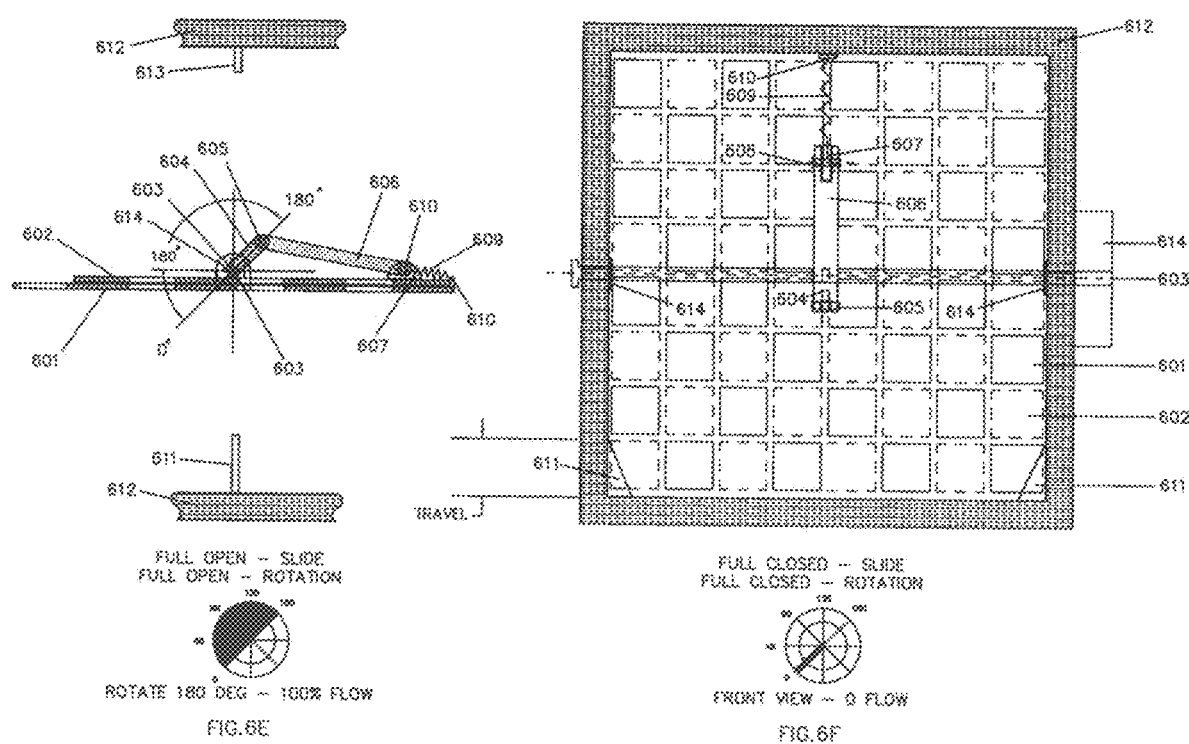

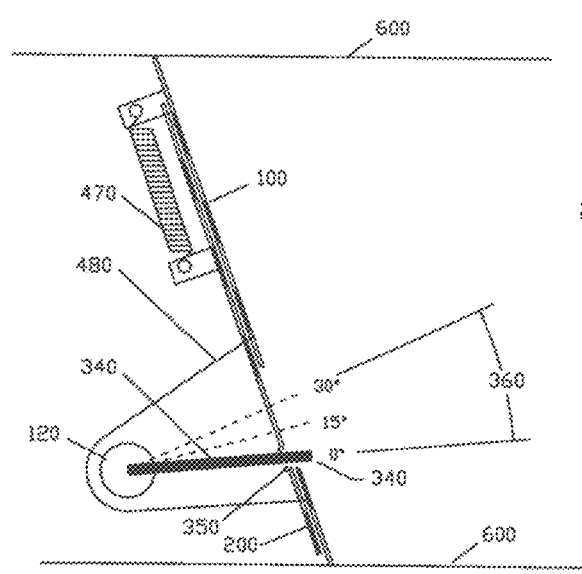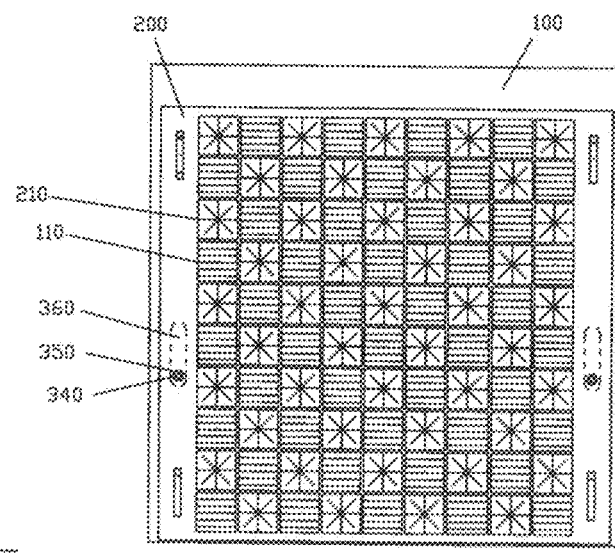
Fig. 8A — POS. #0 – ACTUATOR ROTATION 0 DEGREE SLIDE VALVE CLOSED ROTATION VALVE 0% OPEN
Fig. 7A — POS. #0 – ACTUATOR ROTATION 0 DEGREE SLIDE VALVE CLOSED

POS. #15 - ACTUATOR ROTATION 15 DEG
SLIDE VALVE 50 % OPEN
ROTATION VALVE 0% OPEN

POS. #15 - ACTUATOR ROTATION 15 DEG
SLIDE VALVE 50 % OPEN

POS. 30 – ACTUATOR ROTATION 30
SLIDE VALVE 100% OPEN
ROTATION VALVE 0% OPEN

POS. 30 – ACTUATOR ROTATION 30
SLIDE VALVE 100% OPEN

POS. 45 - ACTUATOR ROTATION 45
SLIDE VALVE 100% OPEN
ROTATION VALVE 15% OPEN

POS. 100 - ACTUATOR ROTATION 100
SLIDE VALVE 100% OPEN
ROTATION VALVE 30% OPEN

Actuator Forces Slide Plate
Fully Closed

ACTUATOR FORCES DAMPER
FULL CLOSED

POS. #0 - ACTUATOR ROTATION 0 DEGREE
SLIDE VALVE CLOSED

POS. #15 - ACTUATOR ROTATION 15 DEG
SLIDE VALVE 50 % OPEN
ROTATION VALVE 0% OPEN

POS. #15 - ACTUATOR ROTATION 15 DEG
SLIDE VALVE 50 % OPEN

ACTUATOR FORCES DAMPER
HALF CLOSED

POS. 30 - ACTUATOR ROTATION 30
SLIDE VALVE 100% OPEN
ROTATION VALVE 0% OPEN

POS. 30 - ACTUATOR ROTATION 30
SLIDE VALVE 100% OPEN

SLIDING AND ROTATABLE VENTED DAMPER FOR THE CONTROL OF A FLUID THROUGH A CONDUIT

FIELD OF THE INVENTION

The present invention relates to an apparatus for controlling the flow of a fluid through a conduit. More specifically, the apparatus may be adjusted to increase the level of flow of the fluid by engaging sliding and rotating mechanisms.

BACKGROUND

Damper systems allow for flow of a fluid in a conduit to be controlled or set a desired level. These systems usually involve the use of apparatuses that somehow obstruct the flow of the fluid. These systems are used in many settings, for example and without intending to limit the scope of the present invention, to control the flow of air in conduits in heating, ventilation, and air conditioning (HVAC) applications. Many of these apparatuses are adjustable, such that different flow levels may be selected via the same apparatus. At times, it is preferable to a have a system which is able to adjust the level of flow quickly and easily without the need to access the conduit itself.

One configuration in which a damper apparatus is often designed comprises the use of one or more blades. These blades may be situated inside of the conduit and may be set at different angles that correspond with different levels of fluid flow. Minimal flow is accomplished by setting the blade at an angle where the blade's surface is on a plane perpendicular to the flow of the fluid. This causes the most obstruction of the flow of the fluid.

In order to obtain maximum flow of the fluid in the conduit, the blade may be set at an angle such that the surface of the blade is on a plane that is parallel with the flow of the fluid. This allows for the fluid to pass over the blade with the least resistance possible. Regularly the flow of the fluid within the conduit needs to be altered to accommodate a certain level, and, therefore, it is desirable to be able to set the blade at a position between the angles allowing for minimum and maximum flow. However, setting one or more blades at such a position creates many problems within the conduit. As the blade is typically positioned at a height approximately at the center of the conduit, when the blade is positioned to allow flow of the fluid, the flow is concentrated at the top and bottom of the conduit due to the surface of the blade obstructing the flow in the center of the conduit. This results in a negative pressure behind the blade. Further, this often causes the flow of the fluid to become turbulent and generate noise within the conduit. The non-laminar flow creates higher energy costs due to inefficient heat transfer, and the noise may become a nuisance.

Therefore there is a need in the art for a damper apparatus that is capable of being set a various flow levels without the complete obstruction of flow at the center of a conduit and the creation of turbulent flow. Further, it is desirable for the apparatus to be quickly and easily controlled from the exterior of the conduit, without the need to enter the conduit.

BRIEF SUMMARY OF THE INVENTION

It is among the objects of this disclosure to overcome the limitations and defects of the heretofore-known devices by providing inventive features to achieve a damper apparatus comprised of a fixed plate and a slide plate, in which the slide plate and the fixed plate have openings completely through the body of the slide plate and the fixed plate. The openings of each may have a size, shape and arrangement pattern and may be substantially similar to one another. The fixed plate and the slide plate may be coupled together and parallel to one another.

When the fixed plate and slide plate are in a closed position, the fixed plate and slide plate are in a plane perpendicular to the flow of a fluid in a conduit. The opening of the slide plate are misaligned with the opening of the fixed plate such that a negligible amount of fluid passes through the openings. The slide plate can then be adjusted to an open position by sliding the slide plate relative to the fixed plate. This movement allows for the opening of the slide plate to begin to align with the openings of the fixed plate. As the openings of the slide plate and fixed plate become more aligned, a greater amount of flow is allowed to pass through the openings. Once the slide plate is moved to its full open position, the opening of the slide plate and the opening of the fixed plate are in full alignment, allowing for maximum flow through the openings.

The fixed plate can also be adjusted to an open position relative to the conduit. The fixed plate may be coupled to a shaft, whereby the fixed plate may rotate about the axis of the shaft. The shaft may be actuated and causing the fixed plate to rotate. As the fixed plate rotates, an open area above and below the fixed plate is increased allowing flow of the fluid to increase. The fixed plate may continue to rotate until the fixed plate is positioned at angle where it positioned in a plane parallel, or near-parallel, to the flow of the fluid.

The rotation of the fixed plate and the sliding of the slide plate may be operated independently, simultaneously, or sequentially. Thereby, different levels of flow may be achieved through a combination of different open and closed positions of the sliding plate and the fixed plate.

BRIEF DESCRIPTION OF THE DRAWINGS

FIGS. 6A-6F are side views of a damper apparatus disposed within a conduit in accordance with another embodiment of the present disclosure.

FIGS. 7A-7C show front views of the damper apparatus at various stages of opening in accordance with one embodiment of the present disclosure.

FIGS. 8A-8F show side views of the damper apparatus at various stages of opening in accordance with one embodiment of the present disclosure.

DETAILED DESCRIPTION OF THE INVENTION

Implementations of the invention provide a damper apparatus adapted to control the flow of fluids or semi-solid materials through ductwork or any other type of conduit 600.

Figure 1:
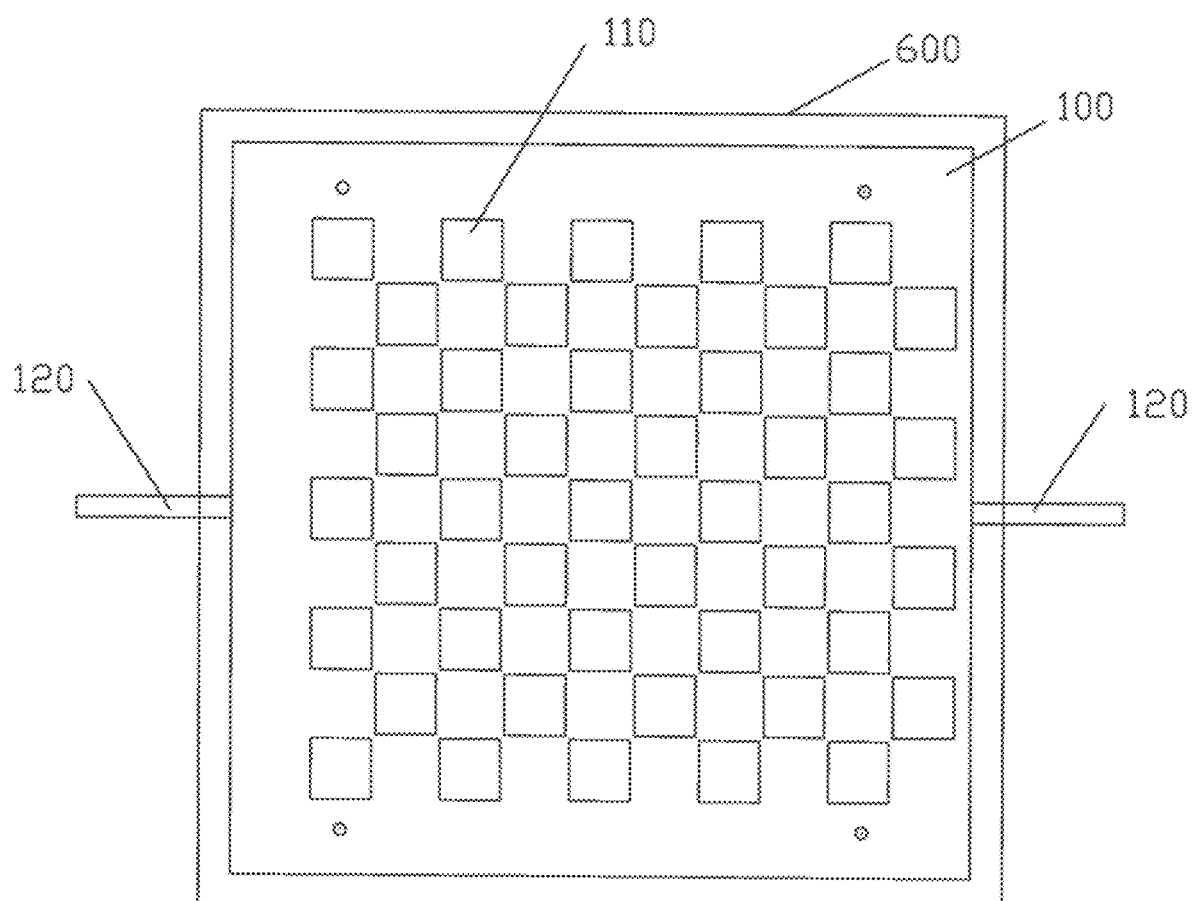
FIG. 1 is a front view of a fixed plate in accordance with the present disclosure.
Figure 2:
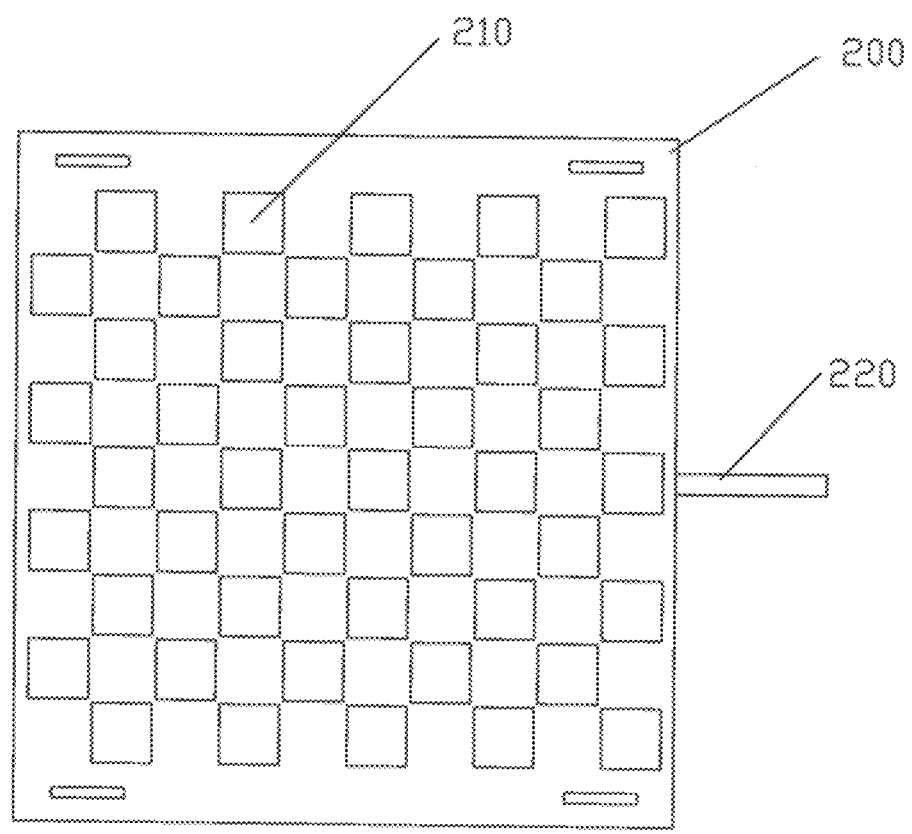
FIG. 2 is a front view of a sliding plate in accordance with the present disclosure.

FIGS. 1 and 2 illustrate a fixed plate 100 and a slide plate 200, respectively, that may be used in an embodiment of the damper apparatus (explained in further detail below with respect to FIGS. 3A-3C). Referring to FIG. 1, the fixed plate 100 is shown having a substantially flat body and one or more openings 110 through the body. In the example embodiment, the shape of the fixed plate 100 is rectangular; however, the fixed plate 100 may be any shape that substantially corresponds with the cross section of any conduit 600 of any shape, including round, square, obround, rectangular, or any other variation of a shaped outlet.

The one or more openings 110 of the fixed plate 100 may have a coordinated size, shape, or pattern of arrangement; however, the one or more openings 110 of the fixed plate 100 are not limited to having a specific size, shape, or pattern of arrangement. The shape of the one or more openings 110 may be any shape, including round, square, obround, rectangular, or any other shape that allows fluid to flow through the fixed plate 100.

The apparatus further comprises an actuator shaft 120, which defines an axis of rotation. In one embodiment of the present disclosure, the actuator shaft 120 extends distally from the fixed plate 100 in a common plane with the fixed plate 100. The fixed plate 100 may rotate about the axis of rotation of the actuator shaft 120. The actuator shaft 120 may be rotatably mounted to the conduit 600.

In FIG. 2, an example embodiment of a slide plate 200 is shown having a substantially flat body and one or more openings 210 through the body. In the example embodiment, the shape of the slide plate 200 is rectangular; however, the slide plate 200 may be any shape that substantially corresponds with the cross section of any conduit 600 of any shape, including round, square, obround, rectangular, or any other variation of a shaped outlet.

The one or more openings 210 of the slide plate 200 may have a coordinated size, shape, or pattern of arrangement; however, the one or more openings 210 of the slide plate 200 are not limited to having a specific size, shape, or pattern of arrangement. The shape of the one or more openings 210 may be any shape, including round, square, obround, rectangular, or any other shape that allows fluid to flow through the slide plate 200.

In one embodiment of the present disclosure, the slide plate 200 further comprises a slide arm 220. The slide arm 220 of the slide plate 200 may extend distally from the slide plate 200 in a common plane with the slide plate 200. The slide arm 220 may be adapted to move the slide plate 200 relative to the fixed plate 100.

Figure 5A:
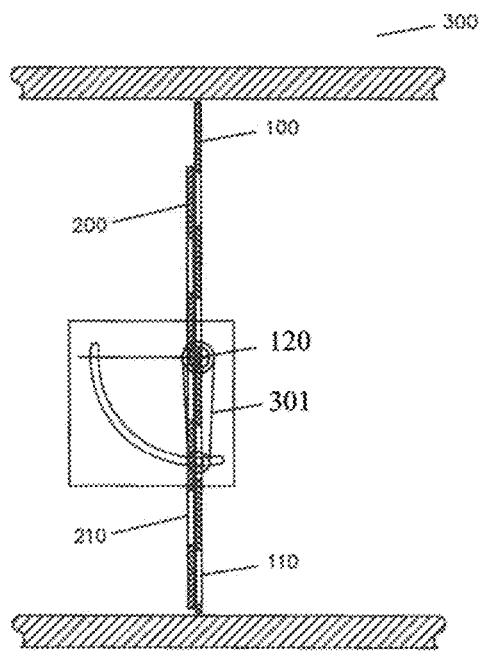
FIGS. 5A-5C are side views of a damper apparatus disposed within a conduit in accordance with one embodiment of the present disclosure.
Figure 5B:
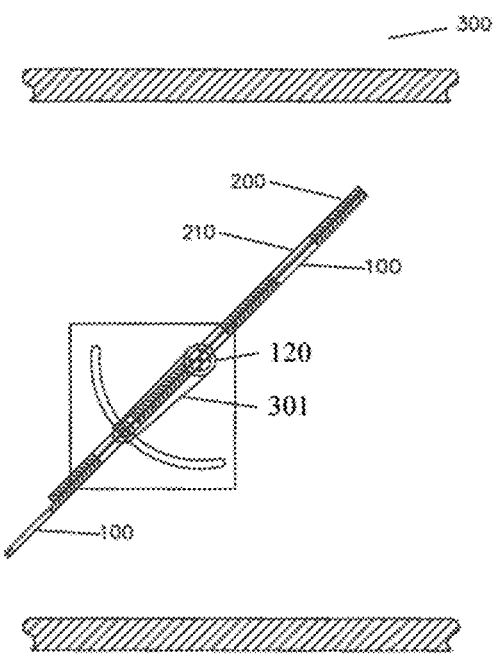
Figure 5C:
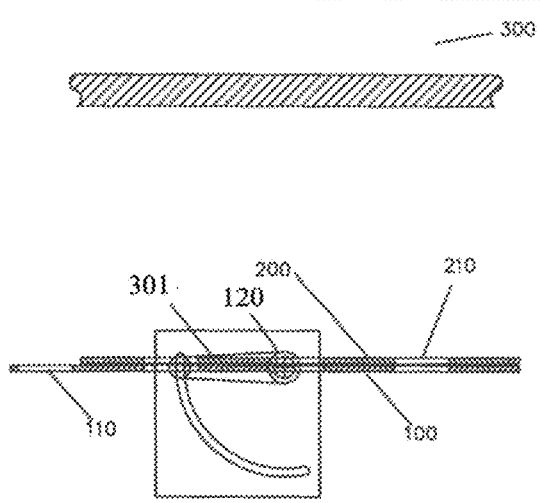

Both the fixed plate 100 and the slide plate 200 may be operable independently between a closed and an open position. As further detailed in FIGS. 3A-3C, the slide plate 200 may be set to an open position, with respect to the fixed plate 100, by sliding the slide plate 200 in a plane adjacent to the fixed plate 100. The slide plate 200 may slide linearly or non-linearly with respect to the fixed plate 100. In another embodiment, as shown in FIGS. 5A-5C and described in more detail below, the fixed plate 100 may be set to an open position, with respect to the conduit 600, by rotating the fixed plate 100 about the axis of rotation of the actuator shaft 120.

Figure 3A:
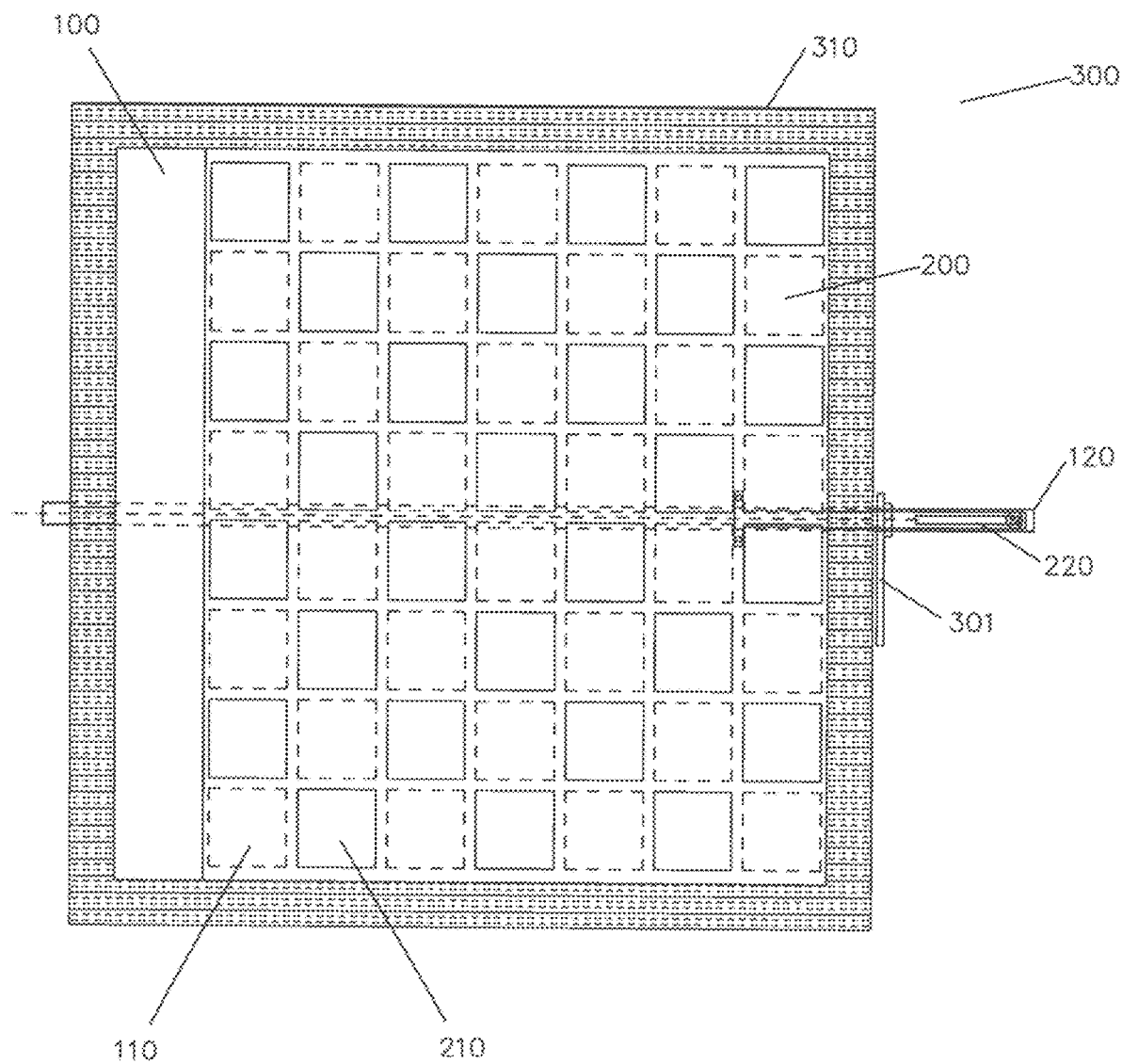
FIGS. 3A-3C are cross-sectional views of a conduit with a damper apparatus in accordance with one embodiment of the present disclosure.
Figure 3B:
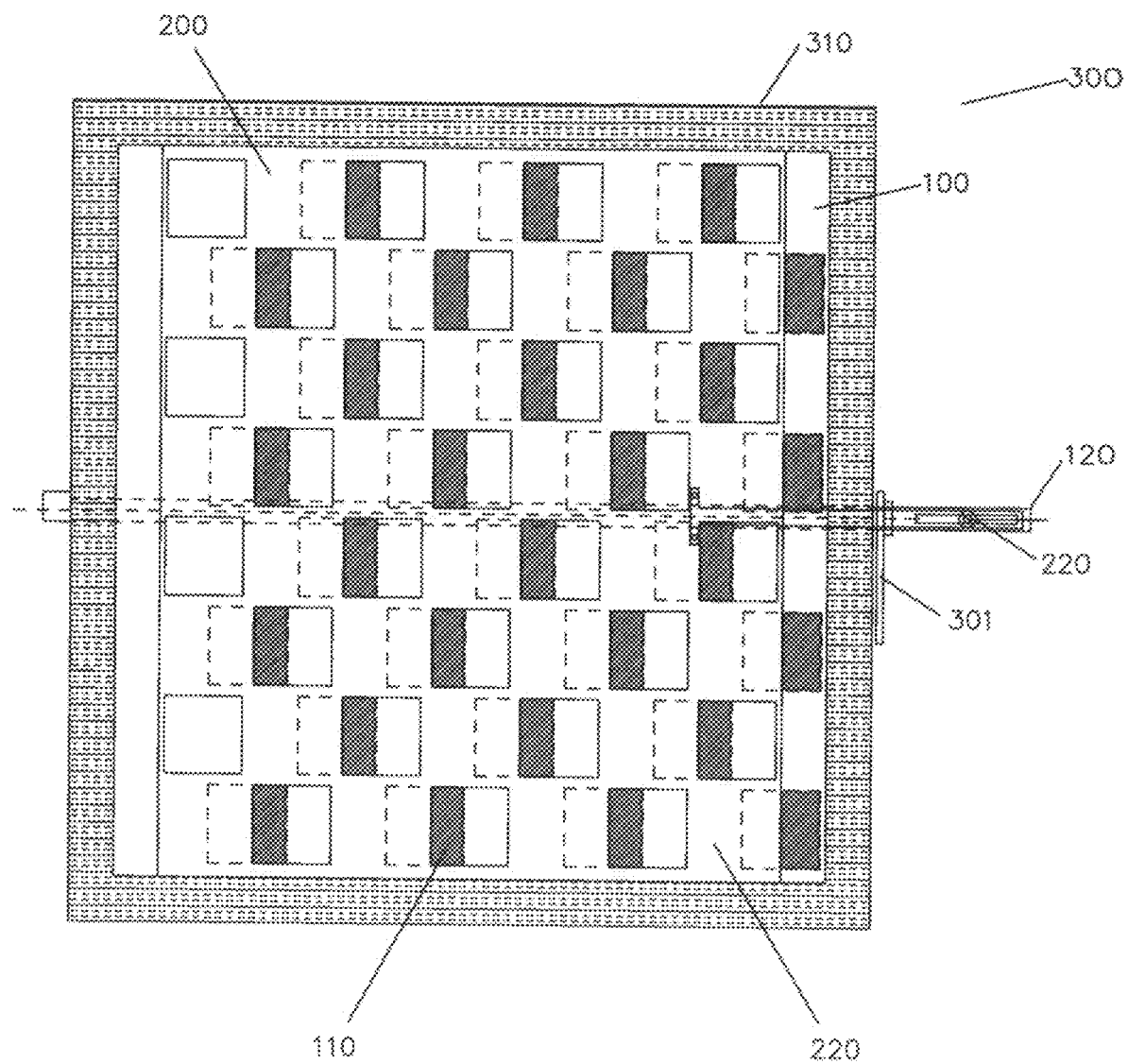
Figure 3C:
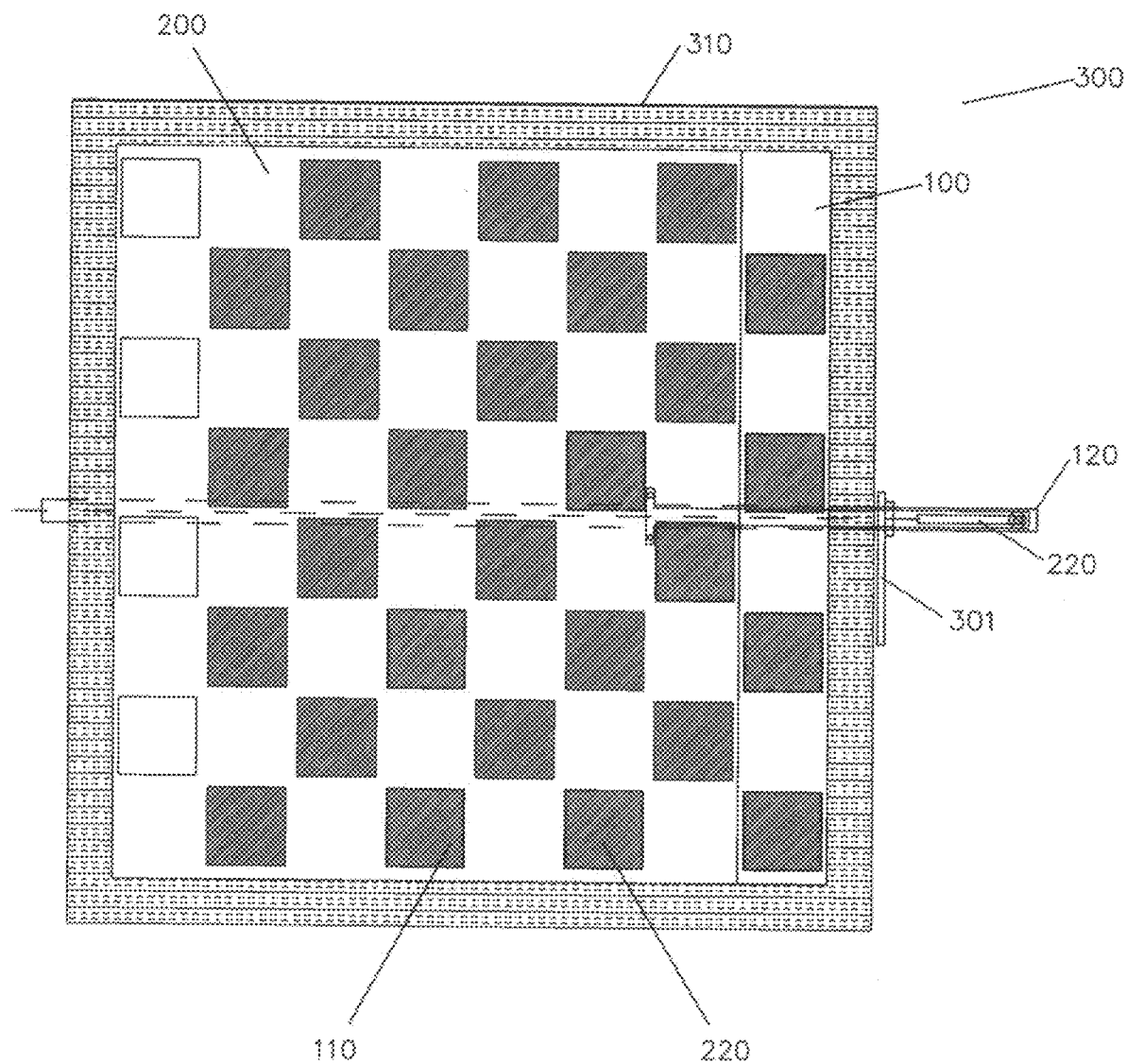

As illustrated in FIGS. 3A-3C, a damper apparatus 300, in accordance with various implementations of the invention, includes a fixed plate 100, a slide plate 200, the actuator shaft 120, a fixed plate arm 301, and a slide arm 220. The fixed plate 100 and the slide plate 200 may have a substantially flat bodies, and one or more openings 110, 210 through their respective bodies. In the example implementation, the shape of the fixed plate 100 and the slide plate 200 are rectangular; however the fixed plate 100 and the slide plate 200 may be any shape that substantially corresponds with the cross section of any conduit of any shape, including round, square, obround, rectangular, or any other variation of a shaped outlet. The slide plate 200 may be positioned in a plane parallel to the plane of the fixed plate 100.

The fixed plate 100 and the slide plate 200 may have one or more openings that allow fluids or semi-solids to flow through each respective body. The one or more openings 110 of the fixed plate 100 may have a coordinated size, shape, or pattern of arrangement; however, the one or more openings 110 of the fixed plate 100 are not limited to having a specific size, shape, or pattern of arrangement. The one or more openings 210 of the slide plate 200 may have a size and arrangement pattern that substantially corresponds to the size and arrangement pattern of the one or more openings of the fixed plate 100.

The shape of the one or more openings 110 of the fixed plate 100 and the one or more openings 210 of the slide plate 200 may be any shape, including round, square, obround, rectangular, or any other shape that allows fluids or semi-solids to flow through the fixed plate 100 and the slide plate 200.

Figure 4A:
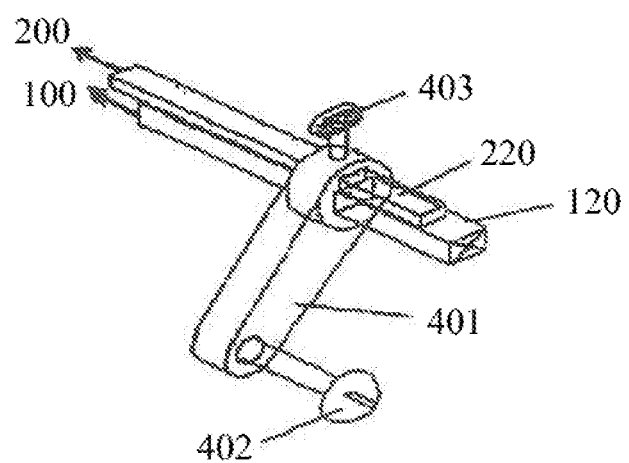
FIGS. 4A-4C are perspective views of drive systems used to engage the sliding and rotation of a slide plate and a fixed plate, respectively, in accordance with one embodiment of the present disclosure.
Figure 4B:
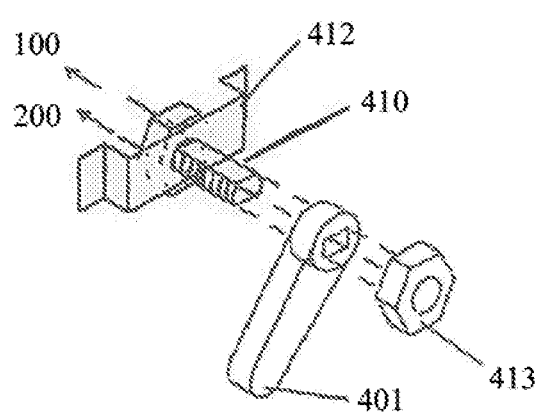
Figure 4C:
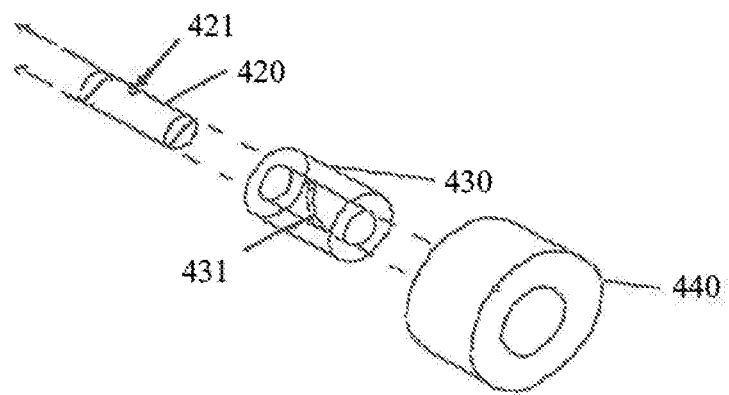

FIGS. 4A-4C show various implementations of a drive system that may be used to actuate the rotation of the fixed plate and the sliding of the slide plate. Referring to FIG. 4A, the slide arm 220 is seated adjacent to the actuator shaft 120. The slide arm 220 may be coupled to the slide plate 200 and may extend distally from the slide plate 200 in a common plane with the slide plate 200. The slide arm 220 may move independent of the actuator shaft 120 and may be adapted to slide the slide plate 200 relative to the fixed plate 100 in a direction that results in the one or more openings of the slide plate 200 substantially aligning with the one or more openings of the fixed plate 100.

The fixed plate arm 401 may be coupled to, and extend radially from the shaft 120. In another implementation, the fixed plate arm 401 may be coupled to, and extend radially from both the actuator shaft 120 and the slide arm 220. A pin 403 may be used to lock the slide arm 220 in a fixed position. The fixed plate arm 401 is adapted to actuate the actuator shaft 120, resulting in the rotation of the fixed plate 100. Additionally, the fixed plate arm 401 is adapted to actuate the sliding of the slide arm 220, resulting in the sliding of the slide plate 200. The fixed plate arm 401 and the slide arm 220 may actuate sequentially or simultaneously. In another implementation, a handle 402 may be coupled to, and extend transversely from the fixed plate arm 401. The handle 402 is adapted to actuate the fixed plate arm 401, which in turn may actuate the actuator shaft 120 or the slide arm 220.

In another implementation, as shown in FIG. 4B, the fixed plate 100 and the slide plate 200 may be coupled to form a rod 410, which extends distally from the fixed plate 100 and the slide plate 200. A bracket 412 may be coupled to the exterior of the conduit 600 and configured to ensure that the rod 410 remains fixed in a vertical direction while being slideable in an axial direction and rotatable about an axis defined by the rod 410. The rod 410 may be threaded or unthreaded, and adapted to receive the fixed plate arm 401 and a fastener 413. The fastener 413 may be configured to fix the position of either the fixed plate arm 401 or the rod 410. The fixed plate arm 401 may be adapted to actuate the sliding and the rotation of the rod 410, resulting in the sliding of the slide plate 200 and rotation of the fixed plate 100, respectively.

In a further implementation, as shown in FIG. 4C, the slide plate 200 may be coupled to a rod 420 having a protrusion 421 positioned on the exterior surface of the rod 420. The rod 420 may be positioned inside a cylinder 430 having a groove 431. The cylinder 430 may be coupled to the fixed plate 100. The protrusion 421 of the rod 420 may lay on the grove of the cylinder 430. A motor 440 may be coupled to the distal end of the rod 420. The motor 440 is configured to rotate the rod 420. As the motor 440 actuates the rod, the groove 431 engages the protrusion 421 of the rod 420 and the rod 420 drives along the cylinder 430 from the distal end of the cylinder 430 to the proximate end of the cylinder 430, thereby sliding the slide plate 200 as the protrusion 421 travels along the groove 431 of the cylinder 430. Once the protrusion 421 reaches the proximal end of the cylinder 430, the motor 440 can continue to actuate the rod 420, thereby pushing against the proximal end of the groove 431 and causing the cylinder 430 to rotate, and resulting in the fixed plate 100 rotating about an axis defined by the rod 420.

Referring back to FIGS. 3A-3C, the slide plate 200 of the damper apparatus 300 may be operable independently, simultaneously, or sequentially with respect to the operation of the fixed plate 100 between a closed and an open position. FIG. 3A shows the damper apparatus 300 having a slide plate 200 in the closed position. In the closed position, the slide plate 200 is oriented so that the one or more openings 210 of the slide plate 200 are misaligned with the one or more openings 110 of the fixed plate 100. When the one or more openings 210 of the slide plate 200 are misaligned with the one or more openings 110 of the fixed plate 100, the slide plate 200 covers the one or more openings 110 of the fixed plate 100, resulting in the obstruction of the flow of fluid through the fixed plate 100 and the slide plate 200. Now referring to FIG. 3B, as the slide plate arm 220 is actuated and the slide plate 200 transitions to the open position, the one or more openings 210 of the slide plate 200 become at least partially aligned with the one or more openings of the fixed plate 100, resulting in the partial obstruction of the flow of fluid through the slide plate 200 and the fixed plate 100. Now referring to FIG. 3C, as the slide plate arm 220 is further actuated the slide plate 200 is moved to the open position, causing the one or more openings 210 of the slide plate 200 to become substantially aligned with the one or more openings 110 of the fixed plate 100. The alignment of the openings 110, 210 of the fixed plate 100 and the slide plate 200 results in minimal obstruction of the flow of fluid through the slide plate 200 and the fixed plate 100.

Figure 5D:
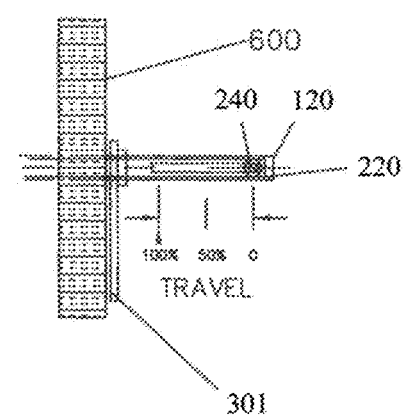
FIG. 5D is a front view of the slide arm and actuator shaft of the embodiment disclosed in FIGS. 5A-5C.

FIGS. 5A-5C illustrate how the fixed plate 100 of the damper apparatus 300 may be operable independently, simultaneously, or sequentially with respect to the operation of the slide plate 200 between a closed and an open position. FIG. 5A shows the damper apparatus 300 having a fixed plate 100 in the closed position. In the closed position, the fixed plate 100 is transverse to the direction of the flow of fluid within the conduit, resulting in at least partial obstruction of the flow of fluid within the conduit. Now referring to FIG. 5B, as the fixed plate 100 transitions to the open position, the fixed plate 100 rotates about the axis of rotation of the actuator shaft 120 of the fixed plate 100. The fixed plate 100 may be rotated via a force acting upon the fixed plate arm 301, causing the actuator shaft to rotate. When the fixed plate reaches the open position, as shown in FIG. 5C, the fixed plate 100 is in substantial parallel alignment with the direction of flow of fluid within the conduit, resulting in only minimal obstruction of the flow of fluid through the conduit. As shown in FIG. 5D, at any position at or between FIG. 5A and FIG. 5C, the slide arm 220 may be locked to actuator shaft 120, whereby the slide plate 200 position may be maintained at any fixed plate 100 position. The slide arm 220 may be secured to the actuator shaft 120 via a locking pin 240 that impedes lateral movement of the slide arm 220 along the actuator shaft 120.

FIGS. 6A-6F illustrate alternative implementations of the damper apparatus as described herein. In FIGS. 6A-6F, a damper apparatus is shown having a main damper plate 601, a slide damper plate 602, a shaft 603, a torque arm 604, a torque joint 605, a connector arm 606, a drive pinion 607, a drive pivot joint 608, a tension spring 609, a slide stop arm 610, and a locking anti-rotation clip 611. The main damper plate 601 and the slide damper plate 602 may have one or more openings that allow fluids or semi-solids to flow through each respective body. The shaft 603 is rotatably mounted onto a conduit 612. In one implementation, the conduit 612 may be an insulating duct work. The locking anti-rotation clip 611 and a damper stop 613 (shown in FIGS. 6D and 6E) are fixed to the conduit 612.

The torque arm 604 may have two ends, and is fixed to the shaft 603 at one end and the connector arm 606 at another end. The connector arm 606 may have two ends, and is pivotally mounted to the torque joint 605 at one end and the drive pinion 607 at another end. The drive pinion 607 is mounted on the drive pivot joint 608 which is fixed to the slide damper plate 602. The tension spring 609 may have two ends, and is connected to the drive pivot joint 608 at one end and the slide stop arm 610 at another end. The slide stop arm 610 is fixed to the main damper plate 601. An operator mechanism 614 that facilitates the rotation of the main damper plate 601 and the slide damper plate 602 is fixed to the rotatable shaft 603.

Referring to FIG. 6A, in operation the operator mechanism 614 is at 0 degrees rotation and the spring 610 is under tension at the start of rotation. The slide damper plate 602 is held tightly against the main damper plate 601 by the locking anti-rotation clip 611. The slide damper plate 602 and the main damper plate 601 are fully closed. In the closed position, the slide damper plate 602 is oriented so that the one or more openings of the slide damper plate 602 are misaligned with the one or more openings of the main damper plate 601. When the one or more openings of the slide damper plate 602 are misaligned with the one or more openings of the main damper plate 601, the slide damper plate 602 covers the one or more openings of the main damper plate 601, resulting in the obstruction of the flow of fluid through the main damper plate 601 and the slide damper plate 602.

Referring to FIG. 6B, when the shaft 603 is rotated 45 degrees, the torque arm 604 rotates 45 degrees and engages the connector arm 606, the drive pinion 607, the drive pivot joint 608 and the slide damper plate 602 resulting in the openings of the main damper plate 601 becoming at least partially aligned with the one or more openings of the slide damper plate 602. In this position, the air flow within the conduit is at 25% of capacity.

Figure 6C:
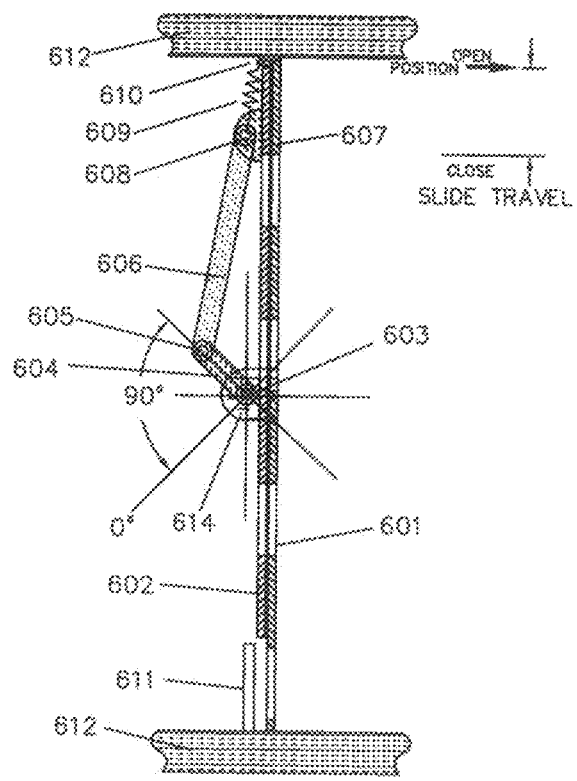
Figure 6C:
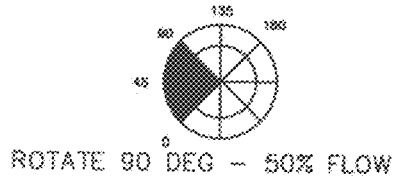

Referring to FIG. 6C, when the shaft 603 has rotated 90 degrees, the torque arm 604 is rotated 90 degrees and engages the connector arm 606, the drive pinion 607, the drive pivot joint 608 and the slide damper 602 relative to the main damper plate 601 until the slide damper plate 602 rests against the tension spring 609 and the slide stop arm 610. In this position, the slide damper plate 602 is now clear of the locking anti-rotation clip 611. Further, the slide damper plate 602 is fully aligned with the holes in the main damper plate 601. The slide plate 602 is now in the open position, where the one or more openings of the slide damper plate 602 are substantially aligned with the one or more openings of the main damper plate 601, resulting in minimal obstruction of the flow of fluid through the slide damper plate 602 and the main damper plate 601. The main damper plate 601 and the slide damper plate 602 remain at 0 degrees of rotation. In this position, the air flow within the conduit is at 50% of capacity.

Figure 6D:
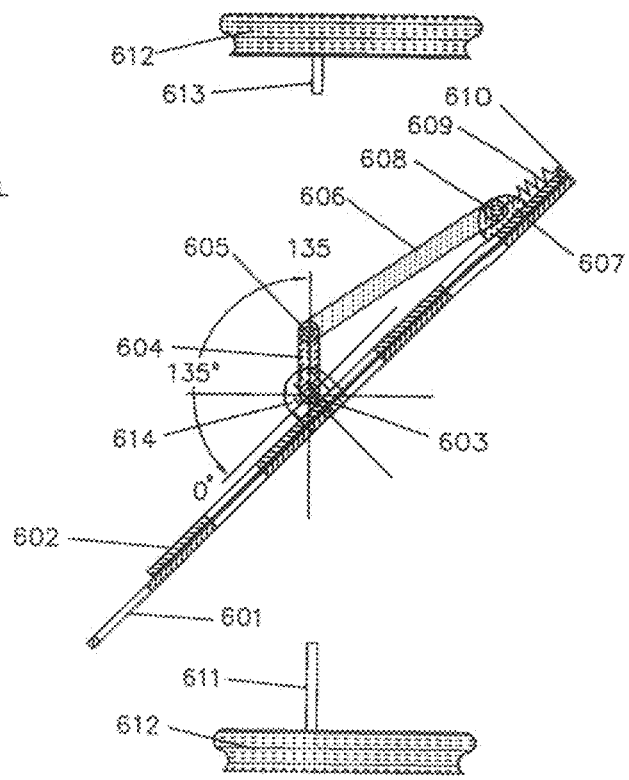
Figure 6D:
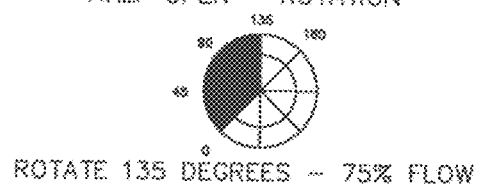

Referring to FIG. 6D, when the shaft 603 is rotated 135 degrees, the torque arm 604 is rotated 135 degrees causing the main damper plate 601 to rotate 45 degrees. The slide damper plate 602 remains in the open position, where the one or more openings of the slide damper plate 602 are substantially aligned with the one or more openings of the main damper plate 601, resulting in minimal obstruction of the flow of fluid through the slide damper plate 602 and the main damper plate 601. In this position, the air flow within the conduit is at 75% of capacity.

Referring to FIG. 6E, when the shaft 603 is rotated 180 degrees, the torque arm 604 has rotated 180 degrees causing the main damper plate to rotate 90 degrees. In this position, the air flow is now at 100% of capacity. To fully close the damper apparatus (as shown in FIG. 6F), the shaft 603 is rotated 180 degrees counter clockwise from its position in FIG. 6E, whereby the assembly takes the position shown in FIGS. 6A and 6F. Further counter clockwise rotation of more than 180 degrees is prevented by damper stop 613.

As demonstrated in FIGS. 7A-7C and FIGS. 8A-8F, in another embodiment of the present disclosure, the actuator shaft 120 is off set from fixed plate 100 by a distance. As detailed in FIGS. 8A-8F, the damper apparatus is furthered comprised of a drive pin 340 radially extending from the actuator shaft 120. A distal end of drive pin 340, opposite an end attached to the actuator shaft 120, may rest within a drive pin socket 350 of the slide plate 200. The drive pin 340 may also be housed within a drive pin slot 360 of the fixed plate 100, the drive pin slot 360 having an upper end and a lower end.

Referring to FIG. 7A, the damper apparatus is shown with the slide plate 200 in the closed position. When the slide plate 200 is in the closed position, the one or more openings 210 of the slide plate 200 are misaligned with the one or more openings 110 of the fixed plate 100, such that a minimal amount of flow of the fluid is allowed to pass through the openings 210 of the slide plate 200 and the openings 110 of the fixed plate 100. In the closed position of the slide plate 200, the drive pin 340 is located proximate the lower end of the drive pin slot 360. The actuator shaft 120 is considered to be at zero degrees of rotation when the slide plate 200 and the fixed plate 100 are both in the closed position.

Figure 7B:
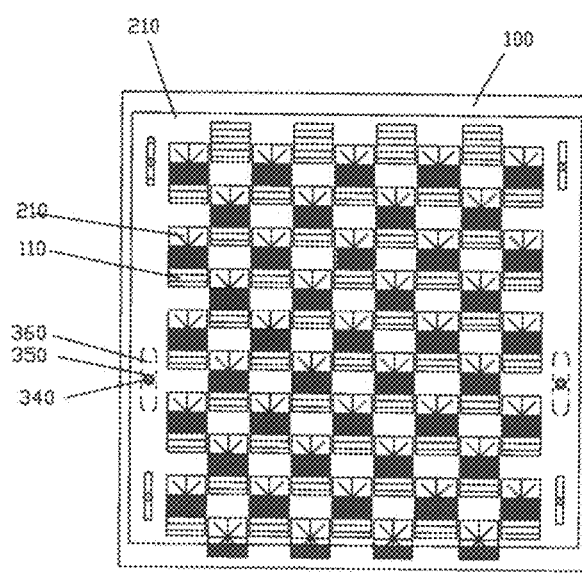

Referring to FIG. 7B, the actuator shaft 120 may rotate, causing the distal end of the drive pin 340 to move toward the upper end of the drive pin slot 360. The drive pin 340 presses against the drive pin socket 350, thereby moving the slide plate 200 relative to the fixed plate 100. As the slide plate 200 is moved relative to the fixed plate 100, the one or more openings 210 of the slide plate 200 begin to overlap and align with the one or more openings 110 of the fixed plate 100. Therefore, flow of the fluid within the conduit 600 may pass through the one or more openings 210 of the slide plate 200 and the one or more openings 110 of the fixed plate 100.

Figure 8B:
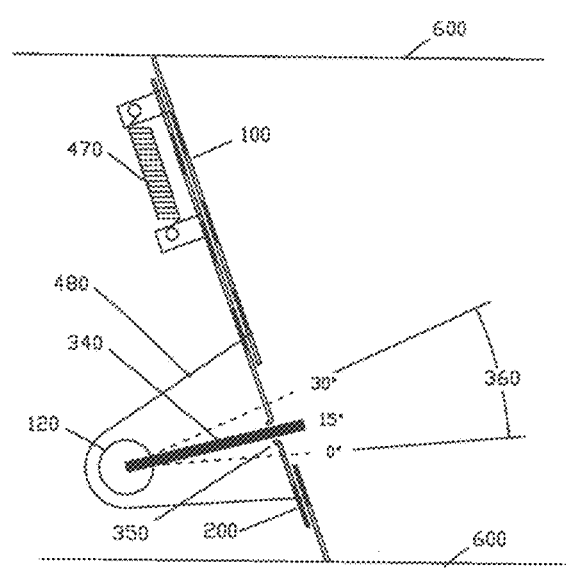
Figures 7C, 8C:
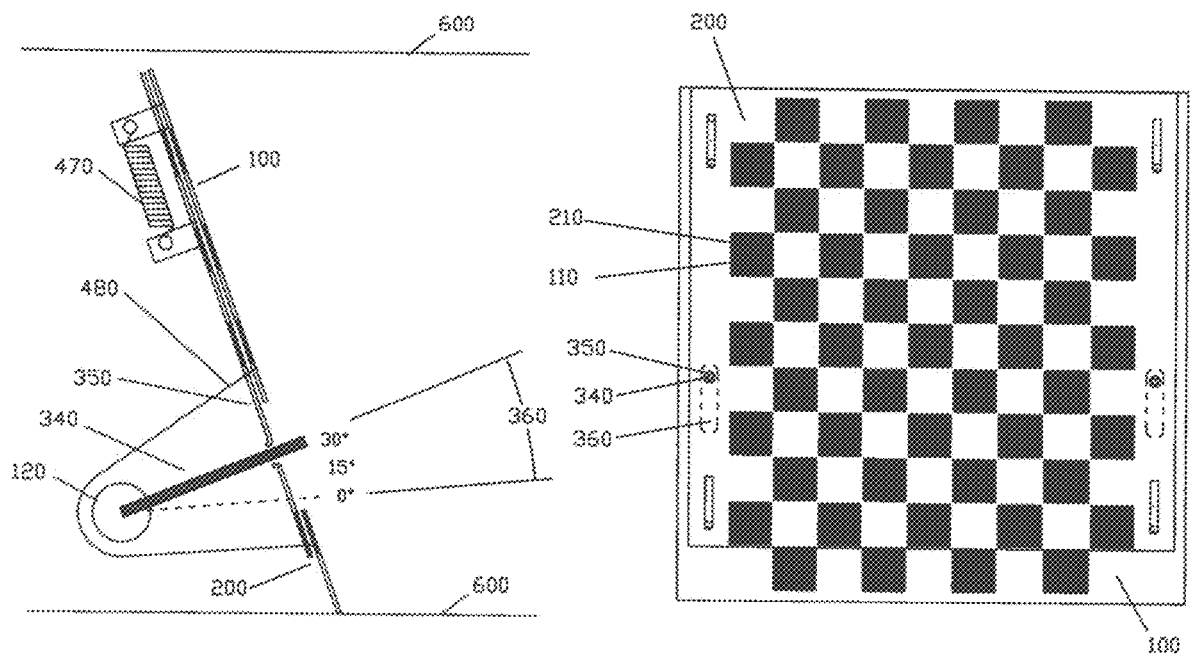

As shown in FIG. 7C, the actuator shaft 120 may be further rotated, whereby the drive pin 340 may be located proximate the upper end of the drive pin slot 360. The further travel of the drive pin 340 causes the slide plate 200 to move to a fully open position, such that the one or more openings 210 of the slide plate 200 are substantially aligned with the one or more openings 110 of the fixed plate 100. Therefore, a maximum amount of flow may pass through the one or more openings 210 of the slide plate 200 and the one or more openings 110 of the fixed plate 100.

Referring to FIG. 8A, a side view of the damper apparatus is shown with the slide plate 200 and the fixed plate 100 in fully closed positions. In one embodiment, the fixed plate 100 substantially extends the entire height of a conduit 600, thereby obstructing the flow of the fluid within the conduit 600. As shown, the damper apparatus may be further comprised of a spring 470, whereby an upper end of the spring 470 is attached to the fixed plate 100 and a lower end of the spring 470 is attached to the slide plate 200. The damper apparatus may be further comprised of a support arm 480 that may be coupled to the fixed plate 100 and rotatable about the axis of the actuator shaft 120, thereby assisting the fixed plate 100 to rotate about the axis of the actuator shaft 120.

As further shown in FIG. 8A, the drive pin 340 extends form the actuator shaft 120 and rests within the drive pin socket 350. Because FIG. 4A shows the slide plate 200 and the fixed plate 100 in fully closed positions, the actuator shaft 120 is considered positioned at zero degrees of rotation. As the slide plate 200 is in the fully closed position, minimal flow may pass through the one or more openings 210 of the slide plate 200 and the one or more openings 110 of the fixed plate 100.

As shown in FIG. 8B, the actuator shaft 120 may rotate about its axis, thereby causing the drive pin 340 to rotate about the axis, as well. As the dive pin 340 rotates about the axis of the actuator shaft 120, the drive pin 340 moves the slide plate 200, via force upon the drive pin socket 350, relative to the fixed plate 100. The movement of the slide plate 200 partially aligns the openings 210 of the slide plate 200 with the openings 110 of the fixed plate 100, such that the slide plate 200 is in the partially open position of FIG. 3B.

Referring to FIG. 8C, a side view of the apparatus is showing with the slide plate 200 in the fully open position. As shown, the actuator shaft 120 has rotated such that the drive pin 340 is located proximate the upper end of the drive pin slot 360. The drive pin 340 has therefore moved the slide plate 200 to a fully open position. The one or more openings 210 of the slide plate 200 are substantially aligned with the one or more openings 110 of the fixed plate 100. Therefore, a maximum amount of flow may pass through the one or more openings 210 of the slide plate 200 and the one or more openings 110 of the fixed plate 100.

In one embodiment of the damper apparatus, the movement of the slide plate 200 from its closed position to the open position may be aided by tension provided by the spring 470.

Figure 8D:
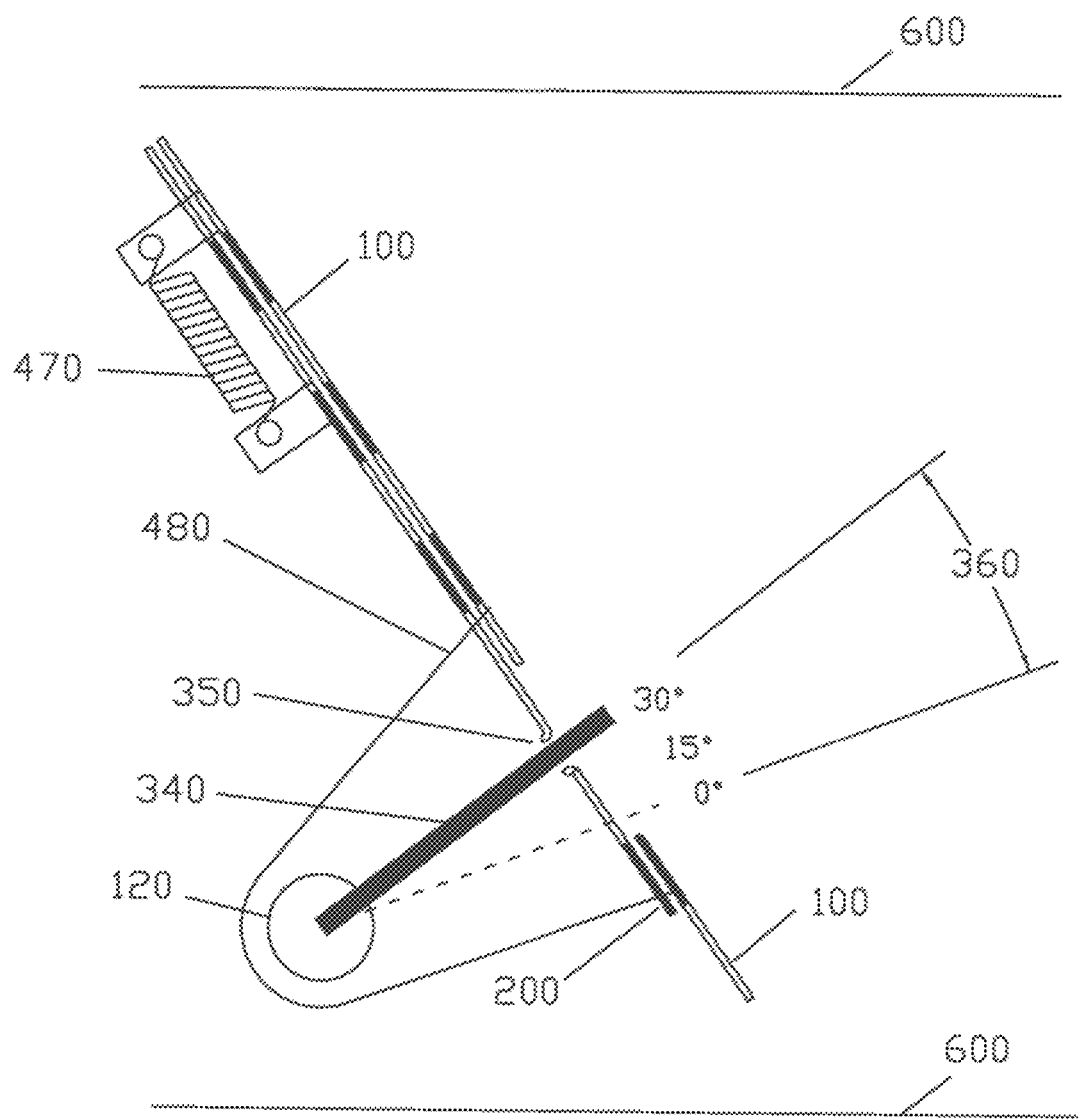

Referring to FIG. 8D, the actuator shaft 120 may rotate beyond the point where the drive pin 340 and the upper end of the drive pin slot 360 make contact. As the actuator shaft 120 continues to rotate, the force by the drive pin 340 upon the upper end of the drive pin slot 360 forces the rotation of the fixed plate 100 and the slide plate 200 about the axis of the actuator shaft 120. The rotation of the fixed plate 100 and slide plate 200 causes the opening between the conduit 600 and the fixed plate 100, thereby allowing for increased flow between the conduit 600 and the fixed plate 100. In one embodiment of the disclosure, the support arm 480 may assist the rotation of the fixed plate 100 and slide plate 200, while also providing support for fixed plate 100 and slide plate 200. In another embodiment of the disclosure, the fixed plate 100 may further comprise a protrusion on a lateral side proximate to the wall of the conduit 600. The protrusion may rest within an arching track, the arching track defining a path taken by the protrusion during rotation of the fixed plate 100.

Figure 8E:
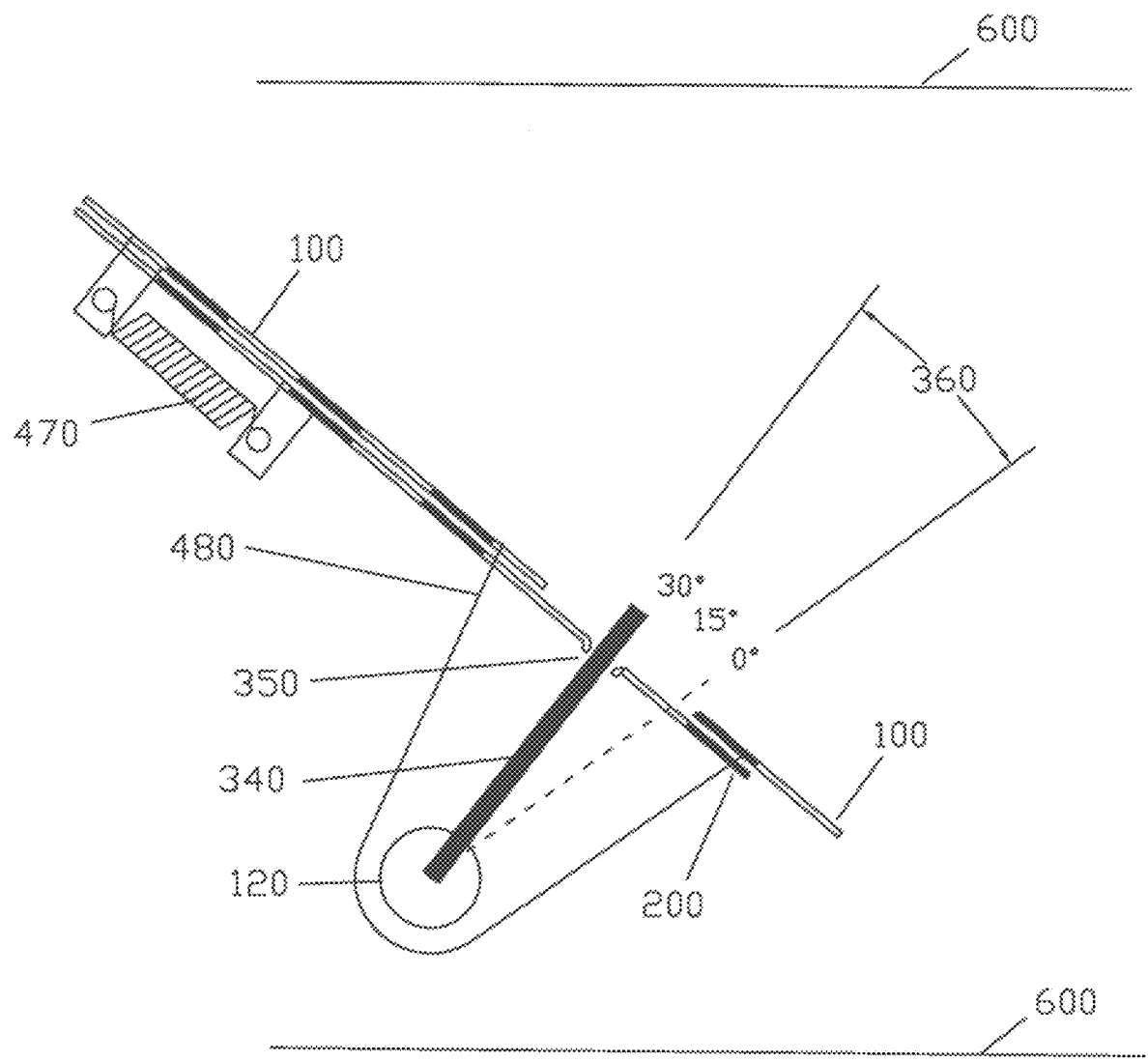
Figure 8F:
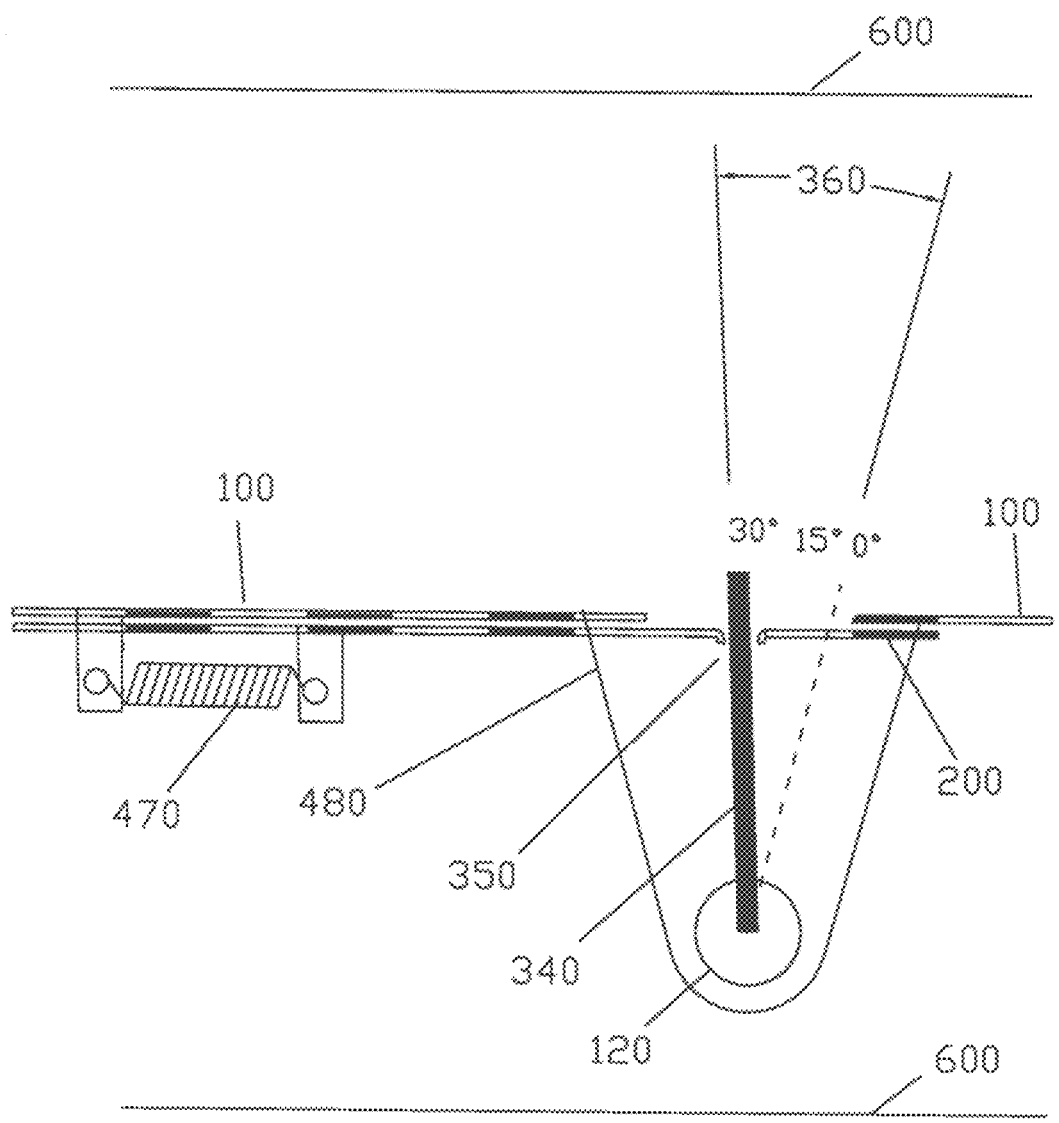

As shown in FIG. 8E, as the actuator shaft 120 rotates further, and in turn the drive pin 340, the opening between the fixed plate 100 and the conduit 600 is increased, causing an increase in the flow of the fluid in the conduit 600. Referring to FIG. 8F, a maximum amount of flow is achieved when the fixed plate 100 has rotated to a position where it is substantially parallel to the flow of the fluid, thereby causing minimal obstruction of the flow. Therefore, the fixed plate 100 is in a fully open position. The actuator shaft 120 may be hindered from rotating beyond the fully open position by an integrated inability for the actuator shaft 120 to rotate beyond a degree corresponding with the fully open position of the fixed plate 100. In an alternative embodiment, the further rotation of the actuator shaft 120 may be hindered by a physical impediment, such as the protrusion of the fixed plate 100 contacting an end of the arching track or a barrier stopping further rotation of the support arm 480.

Figure 10A:
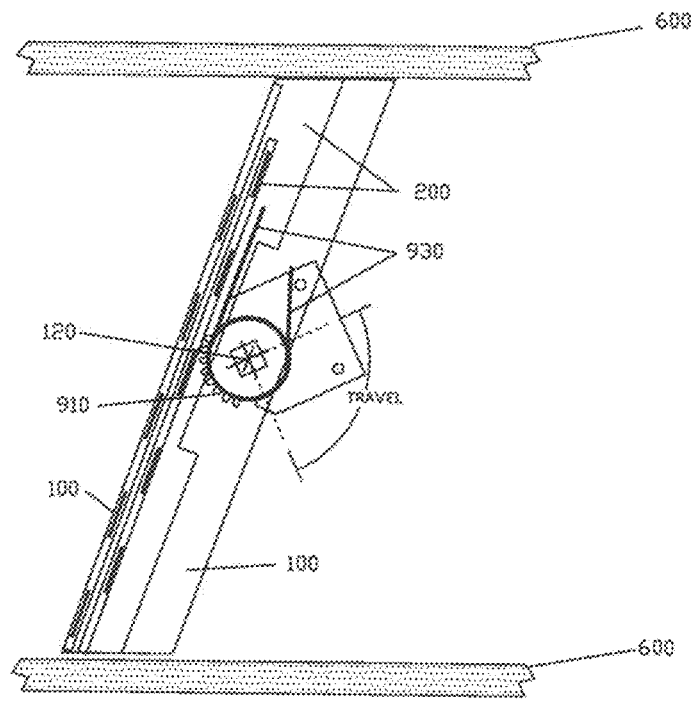
FIGS. 10A-10E show side views of the damper apparatus at various stages of opening in accordance with another embodiment of the present disclosure
Figure 9A:
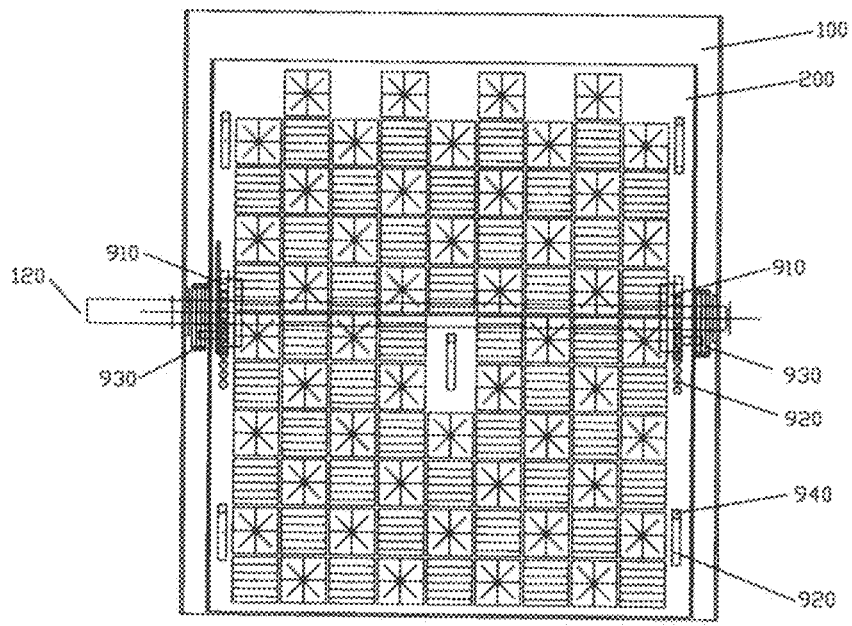
FIGS. 9A-9C show front views of the damper apparatus at various stages of opening in accordance with another embodiment of the present disclosure.
Figure 10B:
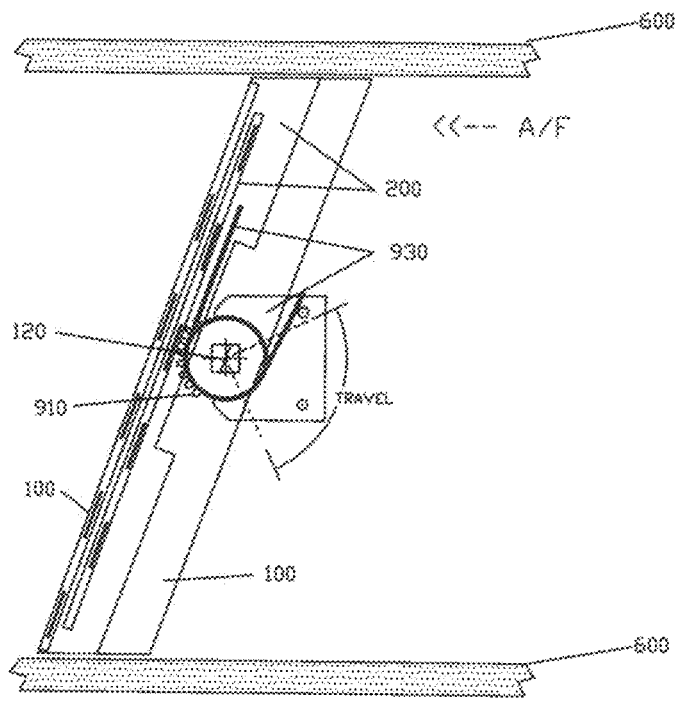
Figure 9B:
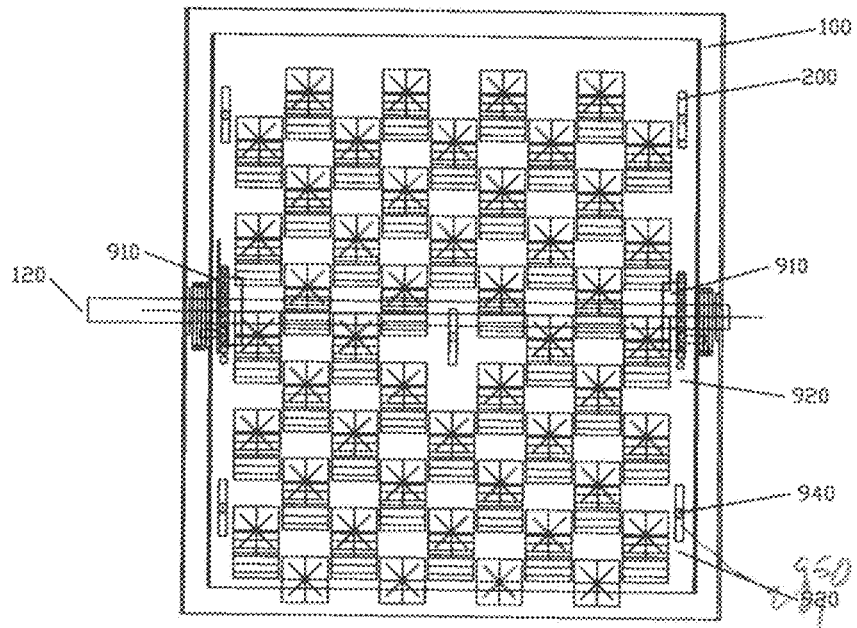

In a separate embodiment of the disclosure, as shown in FIGS. 9A-9C and FIGS. 10A-10E, the sliding of the slide plate 200 and the rotation of the fixed plate 100 may be actuated via a gear 910 attached to the actuator shaft 120. The teeth of the gear 910 may correspond to mating holes 920 on the slide plate 200. As shown in FIGS. 9A and 10A, the fixed plate 100 is in a closed position relative to the conduit 600 and the slide plate 200 is in a closed position relative to the fixed plate 100. The slide plate 200 may further comprise a drive pin 940, which extends into a drive pin slot 950 of the fixed plate. When the slide plate 200 is in a closed position relative the fixed plate 100, the drive pin 940 is situated near the top end of the drive pin slot 950. As shown in FIGS. 9B and 10B, as the actuator shaft 120 rotates, the teeth of the gear 910 engage the corresponding mating holes 920 of the slide plate 200. As the gear 910 further rotates, the teeth of the gear 910 move the slide plate 200 relative to the fixed plate 100, whereby the one or more openings 210 on the slide plate 200 begin to align with the one or more openings 110 on the fixed plate 100. In this embodiment, the disclosure may further comprise a torsional spring 930, whereby the tension in the spring acts against the closing of the slide plate 200. As shown in FIG. 9B, as the slide plate 200 moves relative to the fixed plate 100, the drive pin 940 also move within the drive pin slot 950.

Figure 10C:
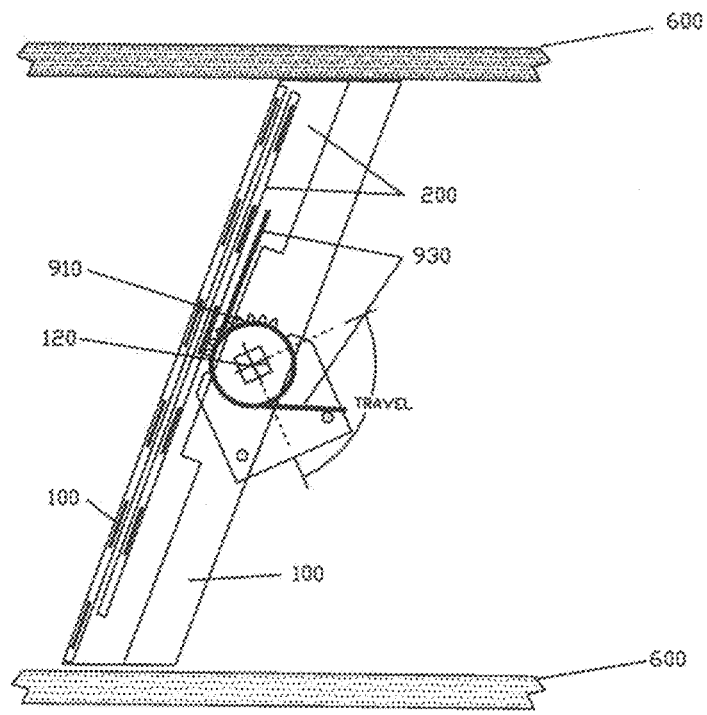
Figure 9C:
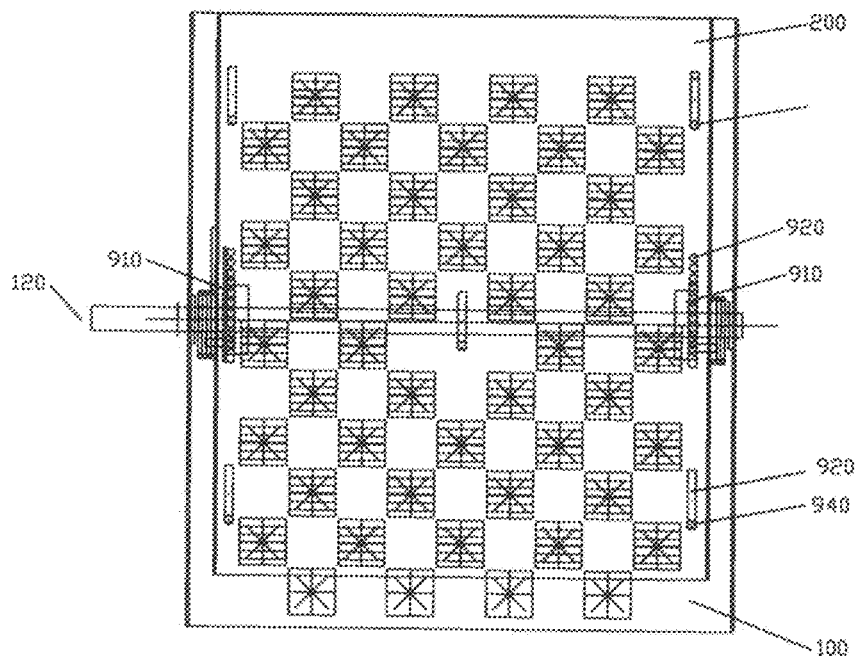
Figure 10D:
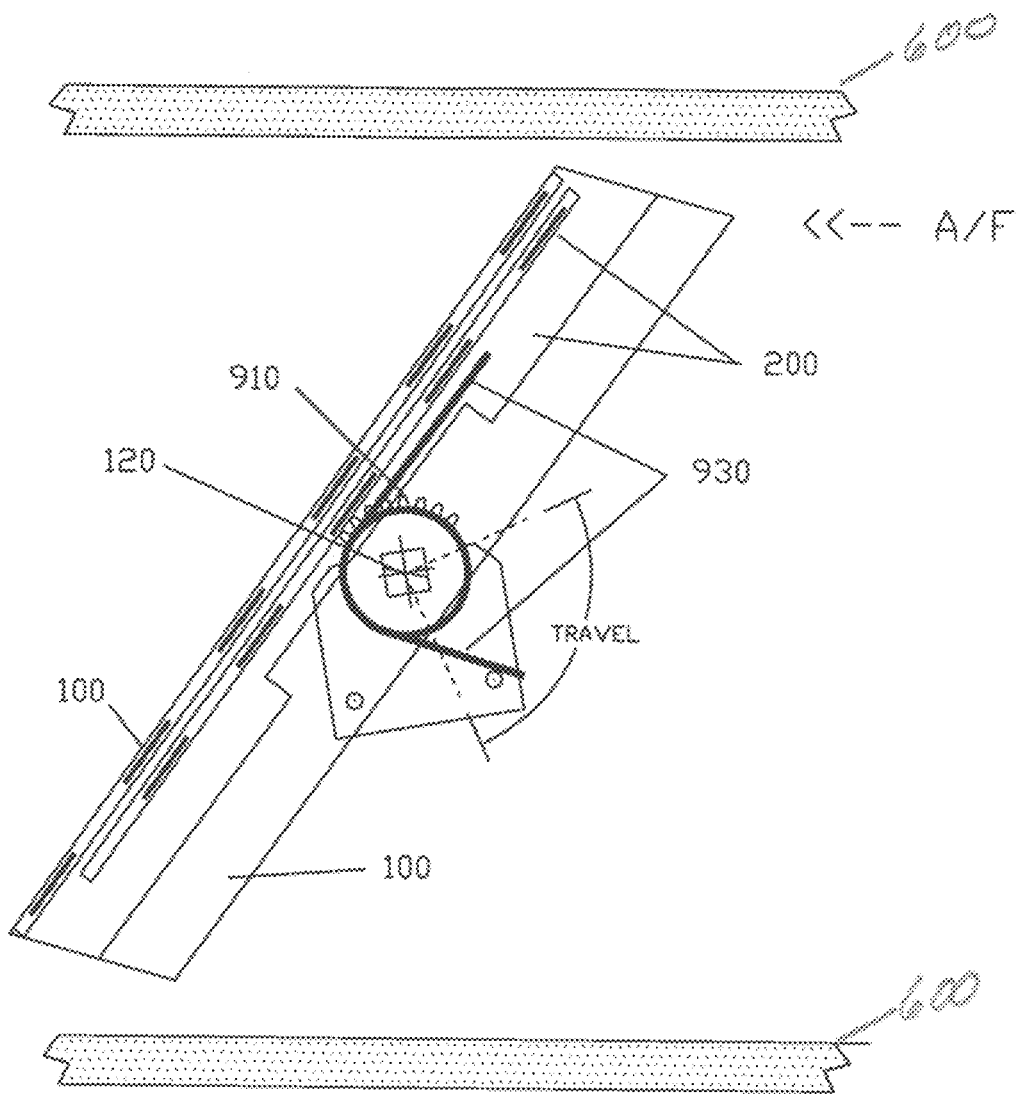
Figure 10E:
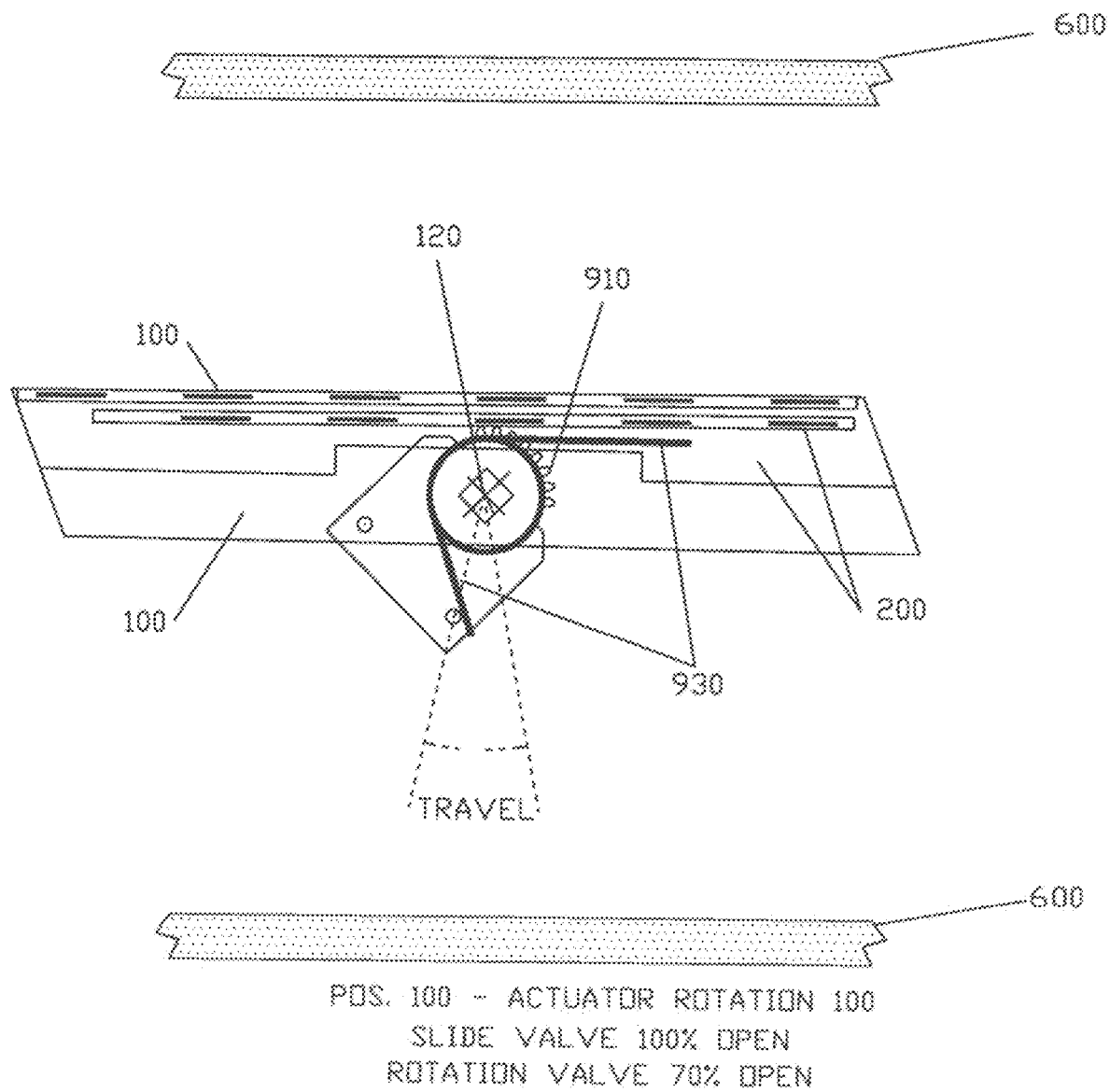

As shown in FIGS. 9C and 10C, as the actuator shaft 120 continues to rotate, the gear 920 continues to move the slide plate 200, until the one or more openings 210 on the slide plate are substantially aligned with the one or more openings 110 on the fixed plate 100. This position corresponds to the fully opened position of the slide plate 200. When the slide plate is in the fully open position relative to the fixed plate, the drive pin 940 is located at an end of the drive pin slot 950. As demonstrated in FIG. 10D, as the actuator shaft 120 continues to rotate past the fully opened position of the slide plate 200, the drive pin 940 acts against the end of the drive pin slot, causing the fixed plate 100 and the slide plate 200 to rotate about the actuator shaft 120. Any further rotation of the actuator shaft 120 causes the fixed plate 100 and the slide plate 200 to continue to rotate about the actuator shaft 120. As shown in FIG. 10E, the fixed plate and the slide plate will continue to rotate until the fixed plate reaches its fully open position relative to the conduit 600, whereby the fixed plate 100 and slide plate 200 are substantially parallel to the flow of fluid in the conduit 600. The tension spring 930 allows for the slide plate 200 to remain in its fully open position relative to the fixed plate 100 throughout the rotation about the actuator shaft 120, by creating a force acting against the closing of the slide plate 200 relative to the fixed plate 100. By reversing the rotation of the actuator shaft 120, the apparatus may proceed in reverse order, whereby the fixed plate 100 is rotated about the actuator shaft 120 until it reaches its fully closed position. Thereafter, further rotation will cause the gear 910 of the actuator shaft 120 to move the slide plate 200 into a closed position, whereby the one or more openings 210 of the slide plate 200 are substantially misaligned with the one or more openings 110 of the fixed plate 100.

In one embodiment of the disclosure, the rotation of the fixed plate 100 may be locked at any point during its rotation. Thereby, rotation of the actuator shaft 120 in a locked position of the fixed plate 100 causes movement of slide plate 200 only. The fixed plate 100 may be locked manually, or the locking process may be automated. The fixed plate 100 may be locked by impeding further movement of the fixed plate 100 itself, the protrusion of the fixed plate 100, or the support arm 480. The locking of the fixed plate 100 may be accomplished through a mechanical lock, such as a physical rod that disallows further movement of the fixed plate 100, or any other method known in the art for locking elements, such as the use of a magnetic lock.

In another embodiment, the slide plate 200 may also be locked relative to the fixed plate 100. The locking of the slide plate 200 may be accomplished through manually affixing the slide plate 200 to a desired position relative to the fixed plate 100 or may be accomplished by locking further movement of the spring 470 coupling the fixed plate 100 and the slide plate 200. Thus, one may achieve many different combinations between fully opened and closed positions of the fixed plate 100 and slide plate 200, thereby allowing the ability to attain an optimal flow in the conduit 600.

In another embodiment of the invention, the slide plate 200 may transition between its closed and open positions by rotating relative to the fixed plated 100. The movement between the closed position of the slide plate 200 and the open position of the slide plate 200 may still be driven via rotation of the actuator shaft 120 causing the drive pin 340 to push against the drive pin socket 350. However, in this embodiment, the force driving the drive pin socket 350 causes the slide plate 200 to rotate about an axis extending perpendicular to the plane of the fixed plate 100. When the actuator shaft 120 is at zero degrees of rotation, the one or more openings 210 of the slide plate 200 are substantially misaligned with the one or more openings 110 of the fixed plate. As actuator shaft 120 is rotated, the drive pin 340 rises causing force upon the drive pin socket 350 of the slide plate 200. The slide plate 200 rotates about the perpendicular axis causing the one or more openings 210 of the slide plate 200 to begin aligning with the one or more openings 110 of the fixed plate 100. As the actuator shaft 120 further rotates about its axis, the drive pin 340 continues to force the slide plate 200 to continue rotating about the perpendicular axis until the one or more openings 210 of the slide plate 200 are substantially aligned with the one or more openings 110 of the fixed plate 100. The slide plate is at that moment in a fully open position. Further rotation of the actuator shaft beyond the fully open position of the slide plate will cause rotation of the slide plate 200 and fixed plate 100 relative to the conduit 600, as described above. Similar to the lateral movement of the slide plate 200, the rotational movement of the slide plate 200 may be locked at any position between its open and closed positions. When the slide plate 200 is in a locked position, rotation of the actuator shaft solely causes rotation of the slide plate 200 and fixed plate 100 relative to the conduit 600, and the slide plate 200 does not rotate relative to the fixed plate 100.

Any reference in this specification to "one embodiment," "an embodiment," an "example embodiment," etc., means that a particular feature, structure, or characteristic described in connection with the embodiment is included in at least one embodiment of the invention. The appearances of such phrases in various places in the specification are not necessarily referring to the same embodiment. In addition, any elements or limitations of any invention or embodiment thereof disclosed herein can be combined with any and/or all other elements or limitations (individually or in any combination) or any invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A damper apparatus adapted to control a flow of a fluid through a conduit, comprising:
    a substantially flat fixed plate, having one or more openings therethrough, said one or more openings defining a size and arrangement pattern;
    a substantially flat slide plate, the slide plate having one or more openings therethrough, said openings in the slide plate defining a size and arrangement pattern substantially corresponding to the size and arrangement pattern of the one or more openings in the fixed plate, the slide plate further adapted for slideable attachment to said fixed plate;
    said fixed plate and said slide plate further attached via a spring;
    said fixed plate being operable independently of said slide plate between a closed position and an open position with respect to said conduit by rotating said fixed plate about an axis of rotation;
    said slide plate being operable independently of said fixed plate between a closed position and an open position with respect to said fixed plate, by sliding said slide plate along said fixed plate;
    said axis of rotation defined by an actuator shaft, the actuator shaft being parallel to said fixed plate and slide plate;
    wherein when said fixed plate is in the open position with respect to said conduit, said fixed plate is in substantial parallel alignment with the direction of flow of fluid within said conduit and therefore only minimally obstructs the flow of fluid through said conduit, and when said fixed plate is in the closed position with respect to said conduit, said fixed plate is transverse to the direction of flow of fluid within said conduit and therefore at least partially obstructs the flow of fluid within said conduit;
    wherein when said slide plate is in the open position with respect to said fixed plate, said one or more openings in said slide plate are substantially aligned with said one or more openings in said fixed plate therefore the flow of fluid through said fixed plate is only minimally obstructed, and wherein when said slide plate is in the closed position with respect to said fixed plate, said one or more openings in said slide plate are at least partially mis-aligned with said one or more openings in said fixed plate therefore the flow of fluid through said fixed plate is at least partially obstructed.

2. The apparatus of claim 1, wherein said actuator shaft is coupled to the fixed plate, and further comprising a fixed plate arm coupled to the actuator shaft, the fixed plate arm adapted to rotate said fixed plate relative to the conduit between said fixed plate open position and fixed plate closed position upon actuation.

3. The apparatus of claim 2, further comprising a slide arm adapted to slide said slide plate relative to said fixed plate between said slide open position and said slide closed position upon actuation.

4. The apparatus of claim 3, wherein said fixed plate arm and said slide are coupled to actuate simultaneously.

5. The apparatus of claim 3, wherein said fixed plate arm and said slide are coupled to actuate sequentially.

6. The apparatus of claim 1, wherein the actuator shaft is spaced a distance from the fixed plate and slide plate, and further comprising at least one drive pin extending radially from the actuator shaft in the direction of the fixed plate and slide plate;
    the slide plate further comprising at least one drive socket adapted for coupling of the at least one drive pin to the slide plate;
    the fixed plate further comprising at least one drive pin slot adapted to house the at least one drive pin between an upper end and a lower end of the drive pin slot;
    wherein when the at least one drive pin in positioned proximate the lower end of the drive pin slot, the one or more openings of the slide plate are not in alignment with the one or more openings of the fixed plate, whereby the flow of the fluid is at least partially obstructed by the slide plate and the fixed plate;
    wherein when the actuator shaft is radially rotated such that the drive pin moves toward the upper end of the drive pin slot, the slide plate is moved relative to the fixed plate in the direction of the upper end of the drive pin slot, whereby the one or more openings of the slide plate approach the one or more openings of the fixed plate and begin to overlap;
    wherein when the actuator shaft is radially rotated a predetermined degree such that the drive pin is positioned proximate the upper end of the drive pin slot, the slide plate is position relative to the fixed plate such that the one or more openings of the slide plate substantially overlap with the one or more openings of the fixed plate, whereby the flow of the fluid is only minimally obstructed;
    wherein further rotation of the actuator shaft beyond the predetermined degree forces the slide plate and the fixed plate to rotate about the axis of the actuator shaft, whereby an open area between the conduit and an outer edge of the attached fixed plate and slide plate is increased allowing greater flow of the fluid through the open area.

7. The apparatus of claim 6, further comprising a support arm coupled to the fixed plate, wherein the support arm may rotate about the axis of the actuator shaft.

8. The apparatus of claim 6, wherein the slide plate may be locked such that rotation of the actuator shaft solely causes rotation of the slide plate and fixed plate with respect to the conduit about the axis of the actuator shaft.

9. The apparatus of claim 6, wherein the fixed plate may be locked such that rotation of the actuator shaft solely causes sliding of the slide plate with respect to the fixed plate.

10. The apparatus of claim 1, wherein the fixed plate is obstructed from rotating beyond a predetermined rotation limit.

11. The apparatus of claim 1, wherein the shape of the fixed plate substantially corresponds to the cross section of the conduit.

12. The apparatus of claim 1, wherein movement of the slide plate relative to the fixed plate in the direction of the lower end of the drive pin slot creates tension in the spring.

13. The apparatus of claim 1, wherein the slide plate is adapted to slide linearly with respect to the fixed plate.

14. The apparatus of claim 1, wherein the slide plate is adapted to slide non-linearly with respect to the fixed plate.

\* \* \* \* \*